United States Patent
Beyer et al.

(10) Patent No.: US 10,241,651 B2
(45) Date of Patent: Mar. 26, 2019

(54) GRID-BASED RENDERING OF NODES AND RELATIONSHIPS BETWEEN NODES

(71) Applicant: SAP SE, Walldorf (DE)

(72) Inventors: Bertram Beyer, Nussloch (DE); Julia Heinrich, Wiesloch (DE); Michael te Uhle, Wiesloch (DE); Hans-Peter Schaerges, Mannheim (DE)

(73) Assignee: SAP SE, Walldorf (DE)

( * ) Notice: Subject to any disclaimer, the term of this patent is extended or adjusted under 35 U.S.C. 154(b) by 195 days.

(21) Appl. No.: 15/387,804

(22) Filed: Dec. 22, 2016

(65) Prior Publication Data
US 2018/0181262 A1    Jun. 28, 2018

(51) Int. Cl.
| | | |
|---|---|---|
| *G06F 3/048* | (2013.01) | |
| *G06F 3/0482* | (2013.01) | |
| *G06N 99/00* | (2019.01) | |
| *G06F 3/0484* | (2013.01) | |

(52) U.S. Cl.
CPC ........ *G06F 3/0482* (2013.01); *G06F 3/04842* (2013.01); *G06F 2203/04806* (2013.01); *G06N 99/005* (2013.01)

(58) Field of Classification Search
CPC ................. G06F 3/0482; G06F 3/0484; G06F 2203/04806
See application file for complete search history.

(56) References Cited

U.S. PATENT DOCUMENTS

| | | | |
|---|---|---|---|
| 6,204,850 B1* | 3/2001 | Green | G06F 17/30958 707/E17.011 |
| 2008/0209392 A1* | 8/2008 | Able | G06F 8/34 717/105 |
| 2014/0164664 A1* | 6/2014 | Gong | G06F 17/5072 710/305 |
| 2015/0135104 A1* | 5/2015 | Osterhoff | G06F 8/20 715/765 |
| 2015/0365299 A1* | 12/2015 | Schaerges | G06Q 10/06 715/736 |
| 2016/0162480 A1 | 6/2016 | Schaerges et al. | |
| 2017/0063639 A1* | 3/2017 | Raponi | H04L 41/145 |

OTHER PUBLICATIONS

U.S. Appl. No. 14/561,866, filed Dec. 5, 2014, Schaerges et al.

* cited by examiner

*Primary Examiner* — Anil N Kumar
(74) *Attorney, Agent, or Firm* — Fish & Richardson P.C.

(57) ABSTRACT

The present disclosure involves systems, software, and computer implemented methods for a grid-based rendering of nodes and relationships between nodes. One example method includes identifying model information that identifies nodes and relationships between nodes. The identified nodes are rendered, in a grid layout in a graphical model. Each cell of the grid includes at most one node, and the cells are separated by lane areas in which connections can be rendered. Connections between the nodes are rendered in the lane areas. The connections correspond to the relationships between the related nodes. One or more portions of the connections are overlapped when two or more connections are drawn in a same lane area. The connections, the nodes, the lane areas are selectable. A user selection of a selectable item is received. In response to the user selection, the connections and nodes that are associated with the selectable item are highlighted.

18 Claims, 22 Drawing Sheets

US 10,241,651 B2

GRID-BASED RENDERING OF NODES AND RELATIONSHIPS BETWEEN NODES

TECHNICAL FIELD

The present disclosure relates to computer-implemented methods, software, and systems for a grid-based rendering of nodes and relationships between nodes.

BACKGROUND

A conceptual model is a type of diagram that can be used to illustrate entities and relationships between entities. For example, a class diagram is a type of conceptual model that can illustrate software classes and associations between the software classes. As another example, an entity relationship diagram can illustrate database entities and relationships between the entities. Relationships can be illustrated, for example, as a connector, such as a line, that connects two related entities. A connector can include cardinality information that includes how many instances of a first entity may be associated with a related entity.

SUMMARY

The present disclosure involves systems, software, and computer implemented methods for a grid-based rendering of nodes and relationships between nodes. One example method includes identifying model information that identifies nodes and relationships between related nodes; rendering, in a graphical model, the identified nodes in a grid layout, wherein each cell of the grid includes at most one node, and wherein the cells are separated by lane areas in which connections can be rendered; rendering, in the lane areas, orthogonal connections between the nodes, the orthogonal connections corresponding to the identified relationships between the related nodes, wherein one or more portions of the orthogonal connections are overlapped when two or more orthogonal connections are drawn in a same lane area, and wherein the orthogonal connections, the rendered nodes, the lane areas comprise selectable items; receiving a first user selection of a first selectable item; and highlighting, in response to the first user selection, orthogonal connections and nodes that are associated with the first selectable item.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

A model can be used to illustrate graphical representations of objects and their relationships. For example, a class diagram is a type of model that can illustrate software classes and associations between the software classes. As another example, an entity relationship diagram is a type of model that can illustrate database entities and relationships between the entities.

Objects can be represented as shapes, such as a square, rectangle, circle, or other type of shape. A shape on a model can be referred to as a node. A relationship between two nodes can be represented as a line that connects the two nodes. A relationship line can be referred to as a connection between the two objects.

A modeling application can present a model on a client device of a user. The modeling application can, for example, read stored model data and can render a graphical model on the client device in a viewport of or other display area associated with the modeling application. The modeling application can be configured to identify, from the stored model data, nodes and connections between the nodes. The modeling application can, for some models, read positional information that describes where to position nodes and/or connections when rendering the graphical model.

As another example, the modeling application can be configured to determine, using one or more algorithms, where to position identified nodes and connections. The modeling application can execute a layout algorithm to determine a spatial arrangement of nodes according to a set of rules. The layout algorithm can determine a best arrangement of nodes with respect to flow, context, and a minimal distance between connected nodes so as to avoid connection overlaps. A line (connection) drawing algorithm can be used to render connected between connected nodes by following a certain pattern to connect source and target nodes, such as to minimize turns in a given connection.

Defining layout and connection algorithms that produce an acceptable result for large, complex models can be challenging. For example, when a graphical model is rendered according to a line rendering algorithm, such as to avoid overlapping connections, an unacceptable amount of white space (e.g., too much whitespace) may appear between some of the rendered nodes, which can result in the user having to scroll the modeling application to view the entire graphical model. As another example, if the modeling application attempts to fit a graphical model within a pre-defined amount of space (e.g., one page, a certain number of pages, one screen, a certain number of screens) on a printed or rendered model, a less than a threshold amount of space may appear between some connections and/or overlapping of connections can occur, which can make the selection and/or distinguishing of connections challenging.

Figure 1:
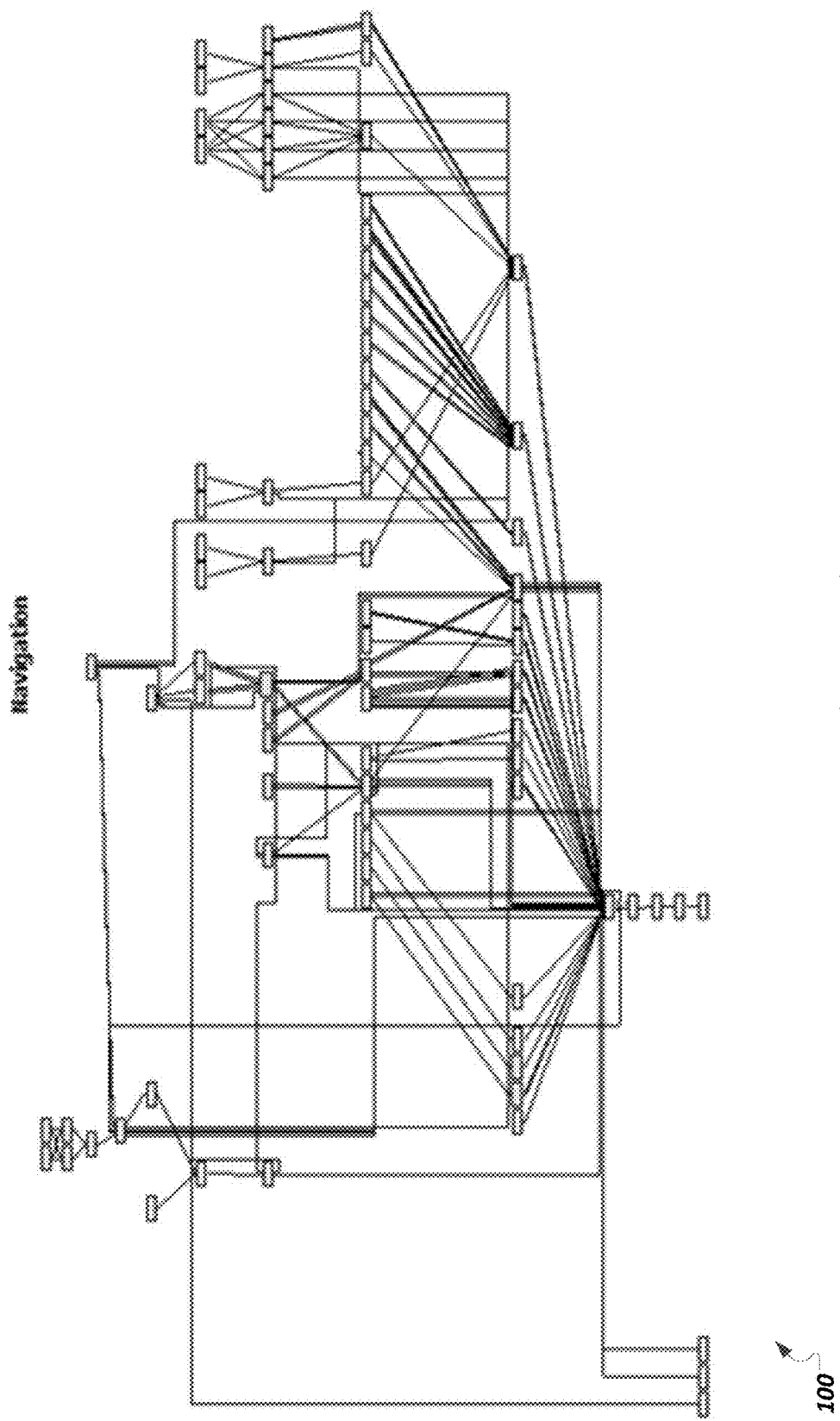
FIG. 1 is an example rendered model in which overlapping connections occur and in which connections in some areas are rendered with less than a threshold amount of distance between connections.

FIG. 1 is an example rendered model 100 in which overlapping connections occur and in which connections in some areas are rendered with less than a threshold amount of distance between connections. Selection of some of the connections of the rendered model 100 may prove difficult for a user.

As another example, the modeling application can enable the user to perform manual movement and sizing operations on nodes and/or connections, with the manual customizations to the graphical model being stored in the stored model data. The modeling application can be configured to honor the user's manual customizations and render the graphical model according to the user's customizations. However, rendering the graphical model according to both the user's manual customizations and an auto layout algorithm can be challenging.

As described in more detail below, to enable consistent rendering and user selection of nodes and connections in large, complex models, another approach can be used which uses orthogonal connections between nodes, partially overlapped connections, and, for some selections, stepwise refinement operations to select a particular connection, while not allowing the user to manually move connections.

The approach of using orthogonal, partially-overlapped connections and stepwise selection can result in improvements over other approaches, such as approaches that attempt to allow selection of objects using one selection input. Model layout and rendering can be predictable and simplified and the model can be rendered so that selectable areas have at least a threshold amount of space on the rendered model, which can enable acceptable selection for users, as compared to models in which connections are drawn close together. Each connection can be predictably rendered independent of other connections. A connection can be rendered based only on grid cells of nodes that are to be connected, for example. The use of overlapping connections can be a scalable approach that can handle the addition of new connections without adding additional selection areas that may cause selection areas to become smaller than desired. The user can use a stepwise refinement selection approach to uncover a particular connection.

Figure 2:
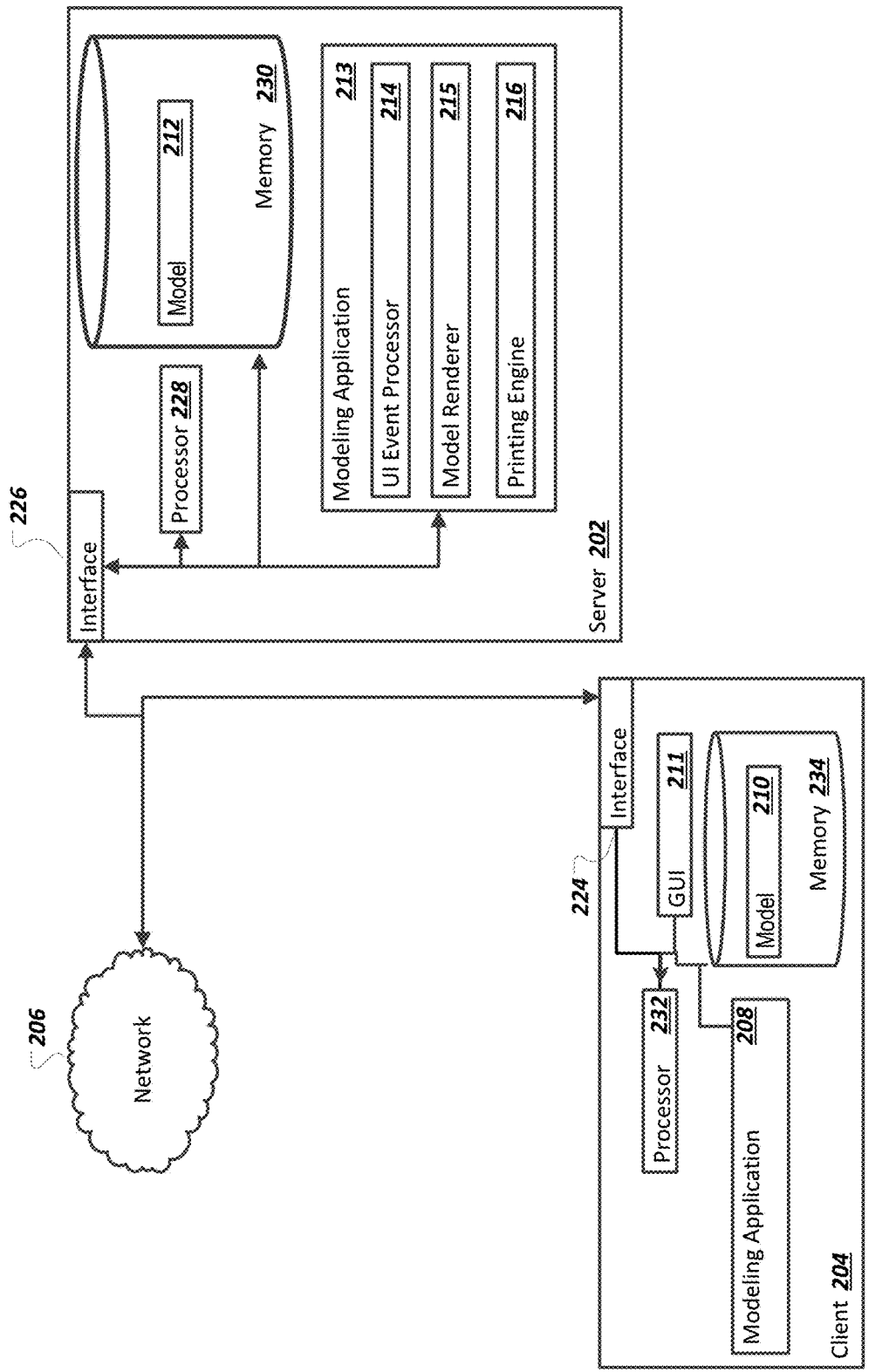
FIG. 2 is a block diagram illustrating an example system for a grid-based rendering of nodes and relationships between nodes.

FIG. 2 is a block diagram illustrating an example system 200 for a grid-based rendering of nodes and relationships between nodes. Specifically, the illustrated system 200 includes or is communicably coupled with a server 202, a client device 204, and a network 206. Although shown separately, in some implementations, functionality of two or more systems or servers may be provided by a single system or server. In some implementations, the functionality of one illustrated system or server may be provided by multiple systems or servers.

A user can use a modeling application 208 on the client device 204 to view and interact with a model 210 on a GUI (Graphical User Interface) 211. The model 210 can be, for example, a class diagram, system diagram, database model, or any other type of graphical model. The model 210 can be created on the client device 204 or can be received from the server 202 as a copy of a model 212 stored on the server 202.

In some implementations, the client device 204 receives the modeling application 208 as a copy of a modeling application 213 provided by the server 202 and the modeling application 213 runs on the client device 204 as a stand-alone application. In some implementations, the modeling application 208 is a client-side version of the modeling application 213 and the modeling application 213 is a server-side version, with the client-side modeling application 208 communicating with the server-side modeling application 213 over the network 206. The modeling application 213 (and/or the modeling application 210) can include various components, such as a UI (User Interface) event processor 214, a model renderer 215, a printing engine 216, and other components.

The model renderer 215 can retrieve model information from the model 212 (or the model 210) that identifies nodes and relationships between related nodes. The model renderer 215 can render the identified nodes in a graphical model on the GUI 211, using a grid layout. Each cell of the grid can include either one or zero nodes. Grid cells can be separated by lane areas which can be used to render connections. For example, the model renderer 215 can render, in the lane areas, for each identified relationship, an orthogonal connection that connects the related nodes. The orthogonal connections can partially overlap one another when two or more orthogonal connections are drawn in a same lane area.

The modeling application 213 (and/or the modeling application 208) can be configured to enable a user to select various objects on a graphical model, such as nodes, connection segments (e.g., overlapped or non-overlapped segments) and other areas, as described in more detail below. For example, a user can cause multiple connections and associated nodes to be selected by performing a first selection input such as the selecting of a lane area portion through which multiple connections pass. The UI event processor 214 can detect selection of the lane area and can instruct the model renderer 215 to highlight the connections that pass through the lane area, and nodes that are associated with those connections. When multiple connections are selected, portions of the selected connections may overlap.

The user can perform other user inputs to uncover a particular connection or set of multiple connections from the overlapped connections. The user can perform a selection extension input for example, by selecting another item on the model 220. As described in more detail below, the model renderer 215 can remove highlighting from connections that pass through the lane area but that are not associated with the other selected item, for example. The user can perform other, stepwise refinement operations until the desired selected object(s) are the remaining selected object(s).

The user may, at certain times, such as when looking at a printout or when looking at a model on the GUI 211, desire to see some or all connections in a non-overlapped state. The modeling editor 208 and the modeling editor 210 can be configured to enable a display of a set of directed tracks which can be used to display non-overlapped connections. A user can progressively perform zoom-out operations to cause the model renderer 215 to display progressively more connections in the directed tracks, until no more overlapped connections are displayed. Overlapped connections, while displayed, can be displayed in a master track that can be positioned between the directed tracks. The user can perform zoom-in operations to cause non-overlapped connections to be moved to the master track. A printing engine 216 can be configured to display a model with connections (either all or a portion) displayed in directed tracks. Directed tracks, as well as the stepwise refine selection described above, are discussed in more detail below with respect to FIGS. 3-21.

As used in the present disclosure, the term "computer" is intended to encompass any suitable processing device. For example, although FIG. 2 illustrates a single server 202, and a single client device 204, the system 200 can be implemented using a single, stand-alone computing device, two or more servers 202, or two or more client devices 204. Indeed, the server 202 and the client device 204 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 202 and the client device 204 may be adapted to execute any operating system, including Linux, UNIX, Windows, Mac OS®, Java™, Android™, iOS or any other suitable operating system. According to one implementation, the server 202 may also include or be communicably coupled with an e-mail server, a Web server, a caching server, a streaming data server, and/or other suitable server.

Interfaces 224 and 226 are used by the client device 204 and the server 202, respectively, for communicating with other systems in a distributed environment—including within the system 200—connected to the network 206. Generally, the interfaces 224 and 226 each comprise logic encoded in software and/or hardware in a suitable combination and operable to communicate with the network 206. More specifically, the interfaces 224 and 226 may each comprise software supporting one or more communication protocols associated with communications such that the network 206 or interface's hardware is operable to communicate physical signals within and outside of the illustrated system 200.

The server 202 includes one or more processors 228. Each processor 228 may be a central processing unit (CPU), a blade, an application specific integrated circuit (ASIC), a field-programmable gate array (FPGA), or another suitable component. Generally, each processor 228 executes instructions and manipulates data to perform the operations of the server 202. Specifically, each processor 228 executes the functionality required to receive and respond to requests from the client device 204, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 2 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 202 includes memory 230. In some implementations, the server 202 includes multiple memories. The memory 230 may include any type of memory or database module and may take the form of volatile and/or non-volatile memory including, without limitation, magnetic media, optical media, random access memory (RAM), read-only memory (ROM), removable media, or any other suitable local or remote memory component. The memory 230 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 202.

The client device 204 may generally be any computing device operable to connect to or communicate with the server 202 via the network 206 using a wireline or wireless connection. In general, the client device 204 comprises an electronic computer device operable to receive, transmit, process, and store any appropriate data associated with the system 200 of FIG. 2. The client device 204 can include one or more client applications, including the modeling application 208. A client application is any type of application that allows the client device 204 to request and view content on the client device 204. In some implementations, a client application can use parameters, metadata, and other information received at launch to access a particular set of data from the server 202. In some instances, a client application may be an agent or client-side version of the one or more enterprise applications running on an enterprise server (not shown).

The client device 204 further includes one or more processors 232. Each processor 232 included in the client device 204 may be a central processing unit (CPU), an application specific integrated circuit (ASIC), a field-programmable gate array (FPGA), or another suitable component. Generally, each processor 232 included in the client device 204 executes instructions and manipulates data to perform the operations of the client device 204. Specifically, each processor 232 included in the client device 204 executes the functionality required to send requests to the server 202 and to receive and process responses from the server 202.

The client device 204 is generally intended to encompass any client computing device such as a laptop/notebook computer, wireless data port, smart phone, personal data assistant (PDA), tablet computing device, one or more processors within these devices, or any other suitable processing device. For example, the client device 204 may comprise a computer that includes an input device, such as a keypad, touch screen, or other device that can accept user information, and an output device that conveys information associated with the operation of the server 202, or the client device 204 itself, including digital data, visual information, or the GUI 211.

The GUI 211 of the client device 204 interfaces with at least a portion of the system 200 for any suitable purpose, including generating a visual representation of the modeling application 208. In particular, the GUI 211 may be used to view and navigate the model 210, various Web pages, or other user interfaces. Generally, the GUI 211 provides the user with an efficient and user-friendly presentation of business data provided by or communicated within the system. The GUI 211 may comprise a plurality of customizable frames or views having interactive fields, pull-down lists, and buttons operated by the user. The GUI 211 contemplates any suitable graphical user interface, such as a combination of a generic web browser, intelligent engine, and command line interface (CLI) that processes information and efficiently presents the results to the user visually.

Memory 234 included in the client device 204 may include any memory or database module and may take the form of volatile or non-volatile memory including, without limitation, magnetic media, optical media, random access memory (RAM), read-only memory (ROM), removable media, or any other suitable local or remote memory component. The memory 234 may store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 204.

There may be any number of client devices 204 associated with, or external to, the system 200. For example, while the illustrated system 200 includes one client device 204, alternative implementations of the system 200 may include multiple client devices 204 communicably coupled to the server 202 and/or the network 206, or any other number suitable to the purposes of the system 200. Additionally, there may also be one or more additional client devices 204 external to the illustrated portion of system 200 that are capable of interacting with the system 200 via the network 206. Further, the term "client", "client device" and "user" may be used interchangeably as appropriate without departing from the scope of this disclosure. Moreover, while the client device 204 is described in terms of being used by a single user, this disclosure contemplates that many users may use one computer, or that one user may use multiple computers.

Figure 3A:
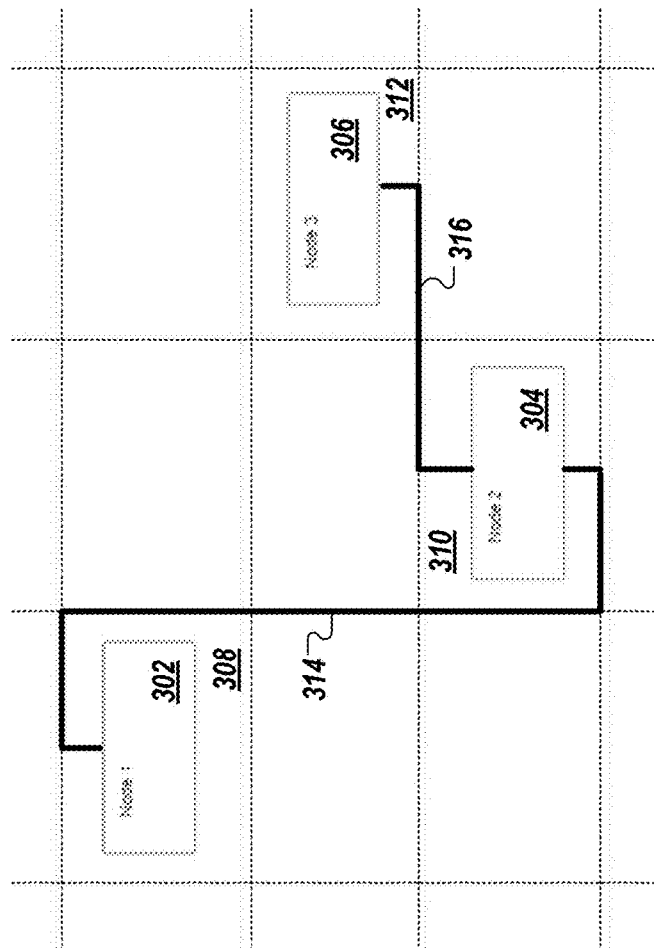
FIG. 3A is a model rendered by the execution of an automatic ("auto") line rendering algorithm in which a grid layout is used along with orthogonal connections between related nodes.

FIG. 3A is a model 300 rendered by the execution of an auto line rendering algorithm in which a grid layout is used along with orthogonal connections between related nodes. A modeling application can render the model 300 in a grid-based viewport. Each grid of the viewport can include either one or zero nodes. The viewport can be configured to not allow manual bending of connections. Each connection can be automatically and predictably rendered independent of other connections. A connection can be rendered, for example, based on the grid cells of related objects that are connected by the connection.

The model 300 includes three nodes 302, 304, and 306 which are shown as respective rectangles. A rendered node 302, 304, or 306 can include information that describes the respective node. The nodes 302, 304, and 306 respectively include node names of "Node 1," "Node 2," and "Node 3." Other information can be displayed inside of a node, such as a node type, or other information, or can be presented upon interaction (e.g., hovering, clicking, etc.) with one or some of the nodes. Each node 302, 304, and 306 is rendered in a respective grid cell 308, 310, or 312 of the grid-based viewport. Each of the nodes 302, 304, and 306 fill part but not all of a respective cell 308, 310, or 312. The part of a respective cell 308, 310, or 312 that is not filled by a respective node 302, 304, or 306 is referred to as a "halo" of a respective node 302, 304, or 306.

The modeling application can draw connections between related nodes according to a set of rules. A node can have an outgoing anchor point for outgoing connections, such as on the upper border of the node, and an incoming anchor point for incoming connections, such as on the lower border of the node. A connection from a source node to a target node can originate at the outgoing anchor point of the source node and end at the incoming anchor point of the target node. For example, a connection 314 connects the node 302 to the node 304 and a connection 316 connects the node 304 to the node 306.

The connections 314 and 316 are drawn so as to cross a halo of a respective node 302, 304, or 306 and orthogonally follow cell borders of the grid layout. The connections 314 and 316 can be drawn so as to minimize the number of turns, or corners, in a respective connection 314 or 316. The connections 314 and 316 can be drawn using a predictable set of rules that are related to the positions of respective source and target nodes and that do not depend on the existence or locations of nodes other than the respective source and target nodes for the respective connection 314 or 316, with the possible exception of an exception case described below with respect to FIG. 3B.

Figure 3B:
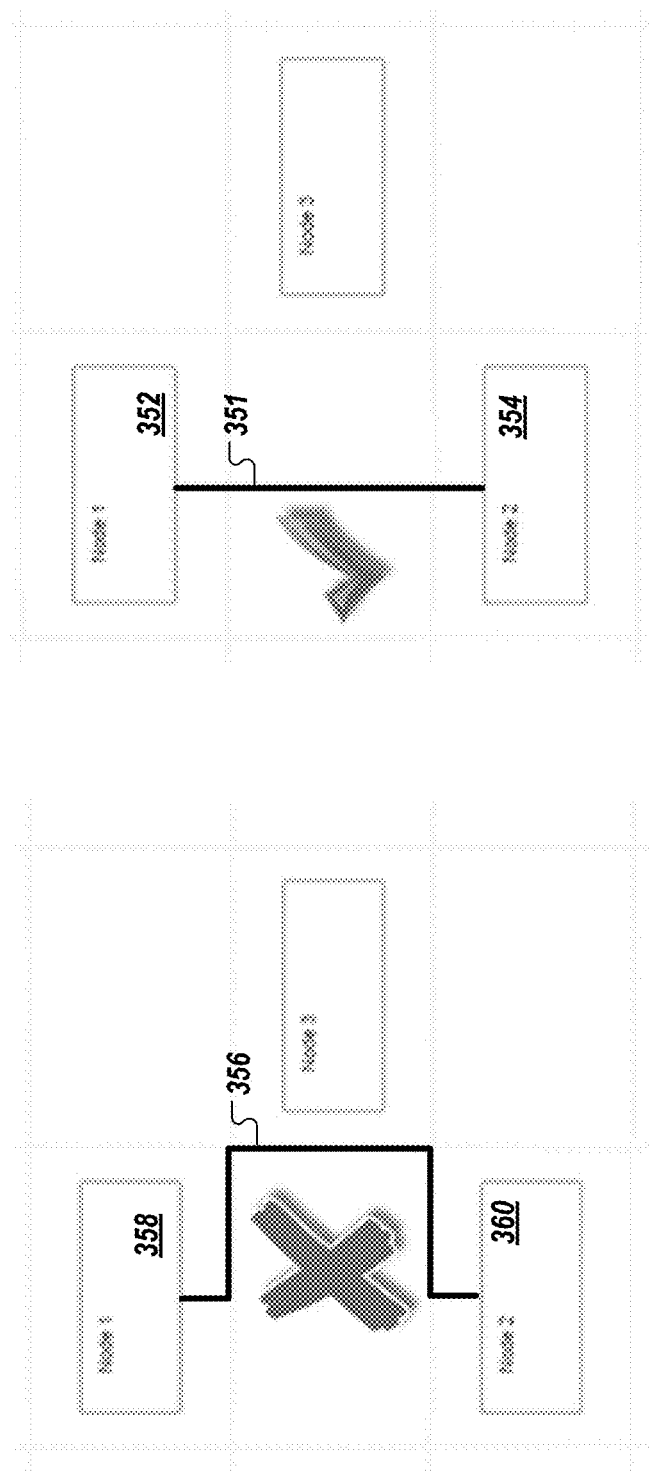
FIG. 3B is a model that illustrates an exception case in which a connection can be drawn without using orthogonal connections or cell borders.

FIG. 3B is a model 350 that illustrates an exception case in which a connection can be drawn without using orthogonal connections or cell borders. The modeling application can render a connection 351 between a source node 352 and a target node 354 as a vertically drawn connection if both the source node 352 and the target node 354 are in the same grid column of the grid layout, the source node 352 is above the target node 354 (as shown), and any cells between the respective cells for the nodes 352 and 354 do not include any nodes. The connection 351 can be considered an intuitive, shortcut connection that can be rendered instead of using an approach such as an orthogonal connection 356 drawn between a source node 358 and a target node 360 that follows cell borders.

Figure 4:
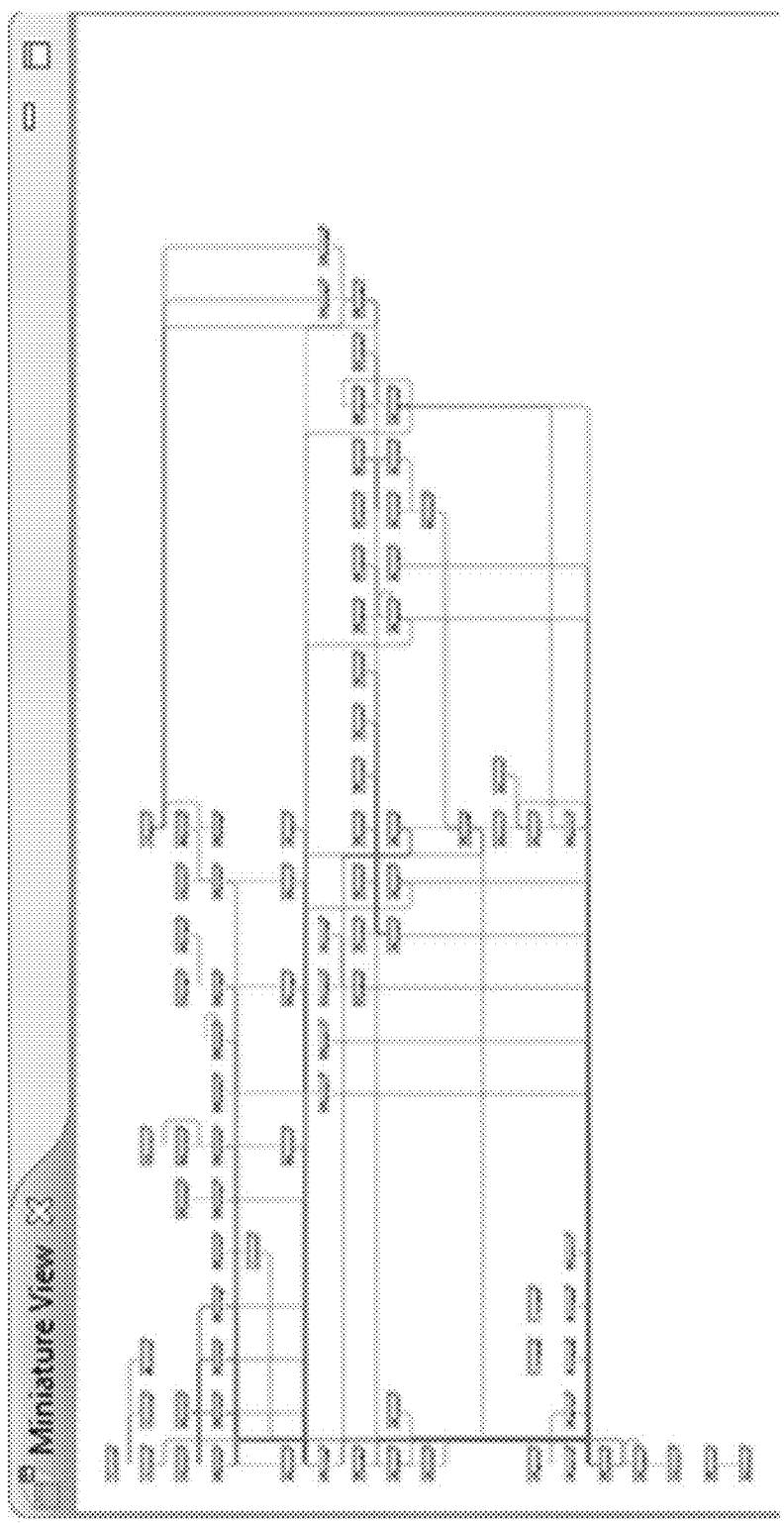
FIG. 4 is a model in which relationships between nodes are illustrated using orthogonal connections.

FIG. 4 is a model 400 in which relationships between nodes are illustrated using orthogonal connections. The layout of the model 400, as compared to the model 100 described above with respect to FIG. 1, can be automatically generated using an algorithm and can result in less whitespace appearing on the model 400 as compared to the model 100. Orthogonal connections and selection of connections in a model such as the model 400 is described in more detail below. The user can select a particular connection using one or more selection operations, and does not have to attempt to select a connection that is close to many other adjacent connections.

Figure 5:
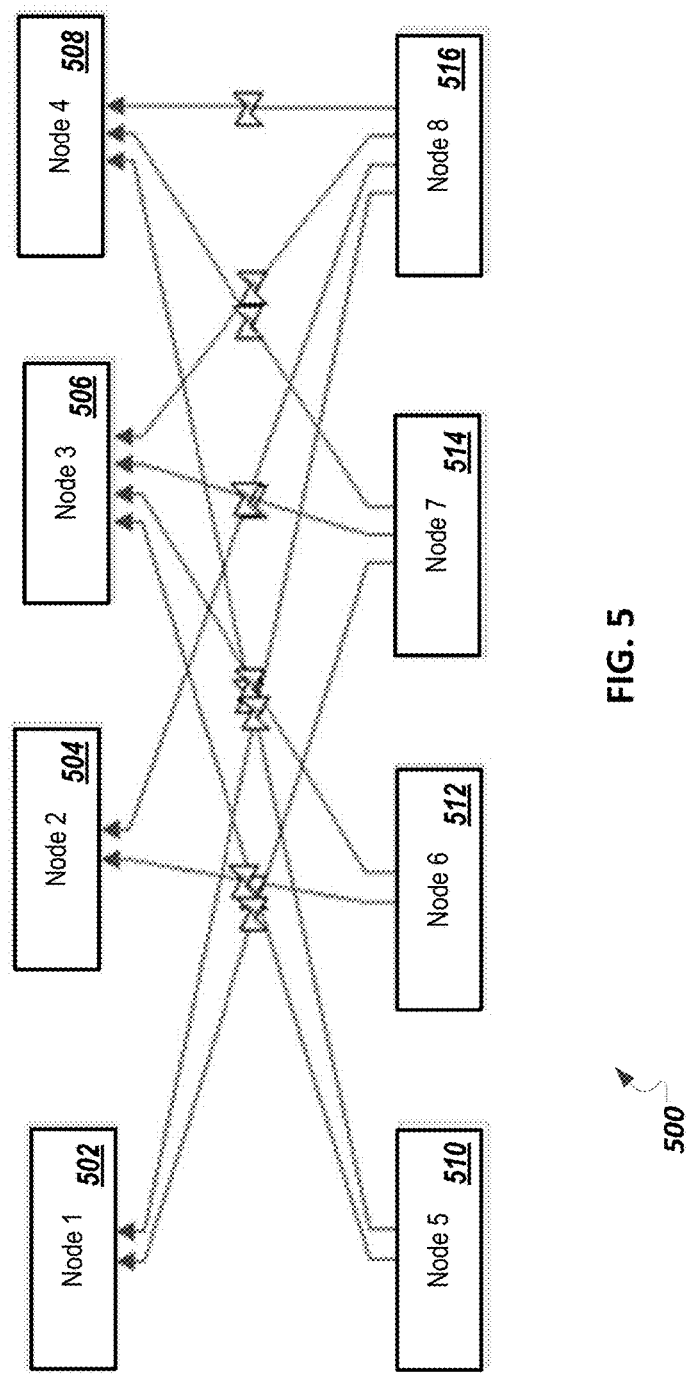
FIG. 5 is a model that is rendered using non-orthogonal lines.

FIG. 5 is a model 500 that is rendered using non-orthogonal lines. The model 500 includes eight nodes 502, 504, 506, 508, 510, 512, 514, and 516 and various connections (often crossing) between those nodes. As described below, the model 500 can be drawn instead using orthogonal connections where a given connection may be intentionally overlapped (e.g., rendered on top of) one or more portions of one or more other connections.

Figure 6:
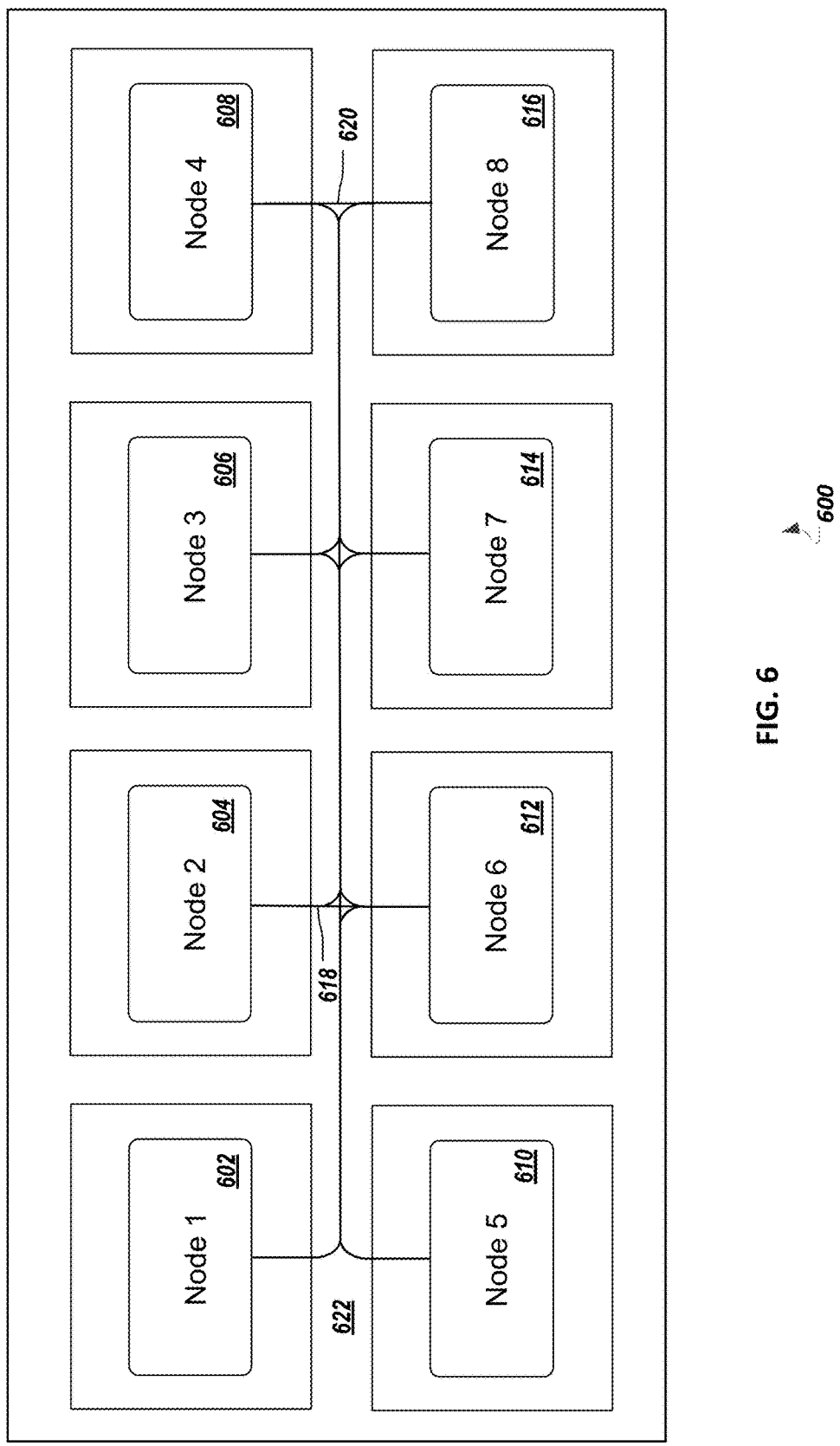
FIG. 6. is a model using orthogonal connections between nodes.

FIG. 6. is a model 600 using orthogonal connections between nodes. The model 600 illustrates a same set of nodes and connections as the model 500. Nodes 602-616 correspond to nodes 502-516. Although some of the connections in the model 600 have rounded corners, the connections in the model 600 will be referred to as orthogonal connections.

Rounded corners can provide some meaning or clues regarding how nodes may be connected with other nodes. Rounding on the connectors connected to the node 602 and the node 610 indicates that the node 602 and the node 610 are not connected to one another. A straight vertical line 618 between the node 604 and the node 612 indicates that the node 604 and the node 612 are connected. Similarly, a straight vertical line 620 between the node four 608 and the node 616 indicates that the node 608 and the node 616 are connected. The lack of a straight line directly connecting the node 606 and the node 614 indicates that the node 606 and the node 614 are not connected. The lack of a rounded curve curving towards the node 604 and connecting to the vertical line 618 from the left indicates that the node 604 is not connected to either the node 602 or the node 610.

The model 600 includes lane areas, including a lane 622, that separate grid cells from one another. Portions of connections can be rendered within the lane 622. Connections can be partially overlapped with other connections, such as if multiple connections originate or end at a same node. As described in more detail below, a user can perform a set of stepwise selection operations to uncover overlapping and to select one or a few number than all of the rendered connections.

Figure 7:
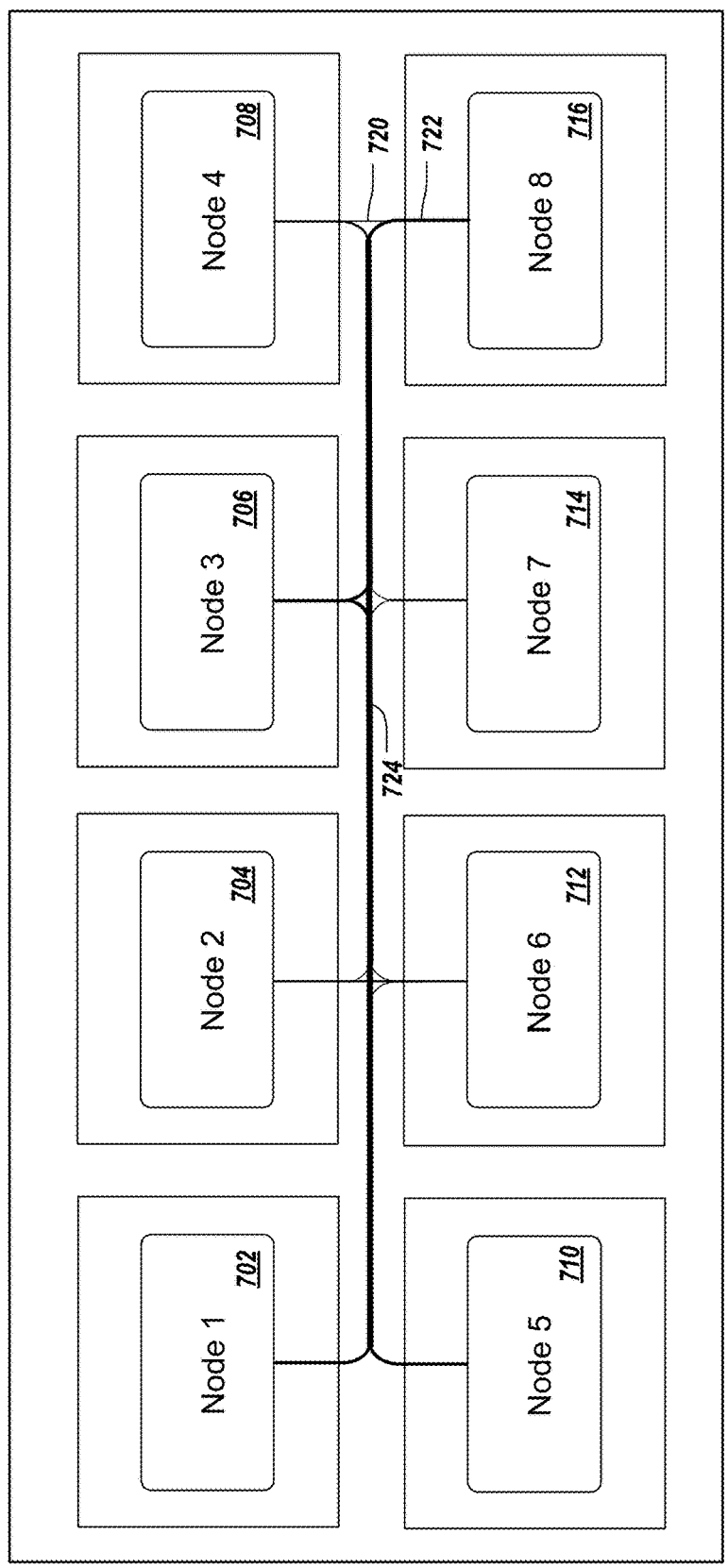
FIG. 7 is a model in which different portions of overlapped connections are styled using different styles to provide insight regarding the number of connections in a respective portion.

FIG. 7 is a model 700 in which different portions of overlapped connections are styled using different styles to provide insight regarding the number of connections in a respective portion. Nodes 702-716 correspond to nodes 602-616. Different styles can include differing levels of darkness or transparency, such as using darker lines for portions that represent more connections than portions representing fewer connections. As another example, thicker lines can represent a higher number of connections than thinner lines. For example, a connection portion 720 is rendered using a relatively thinner line than portion 722, indicating that the portion 720 represents fewer connections (e.g. one connection) than the portion 722 (e.g., two connections). As another example, a portion 724 is rendered with a thicker line than the portion 722, indicating that more connections share the portion 724 than share the portion 722.

Figure 8:
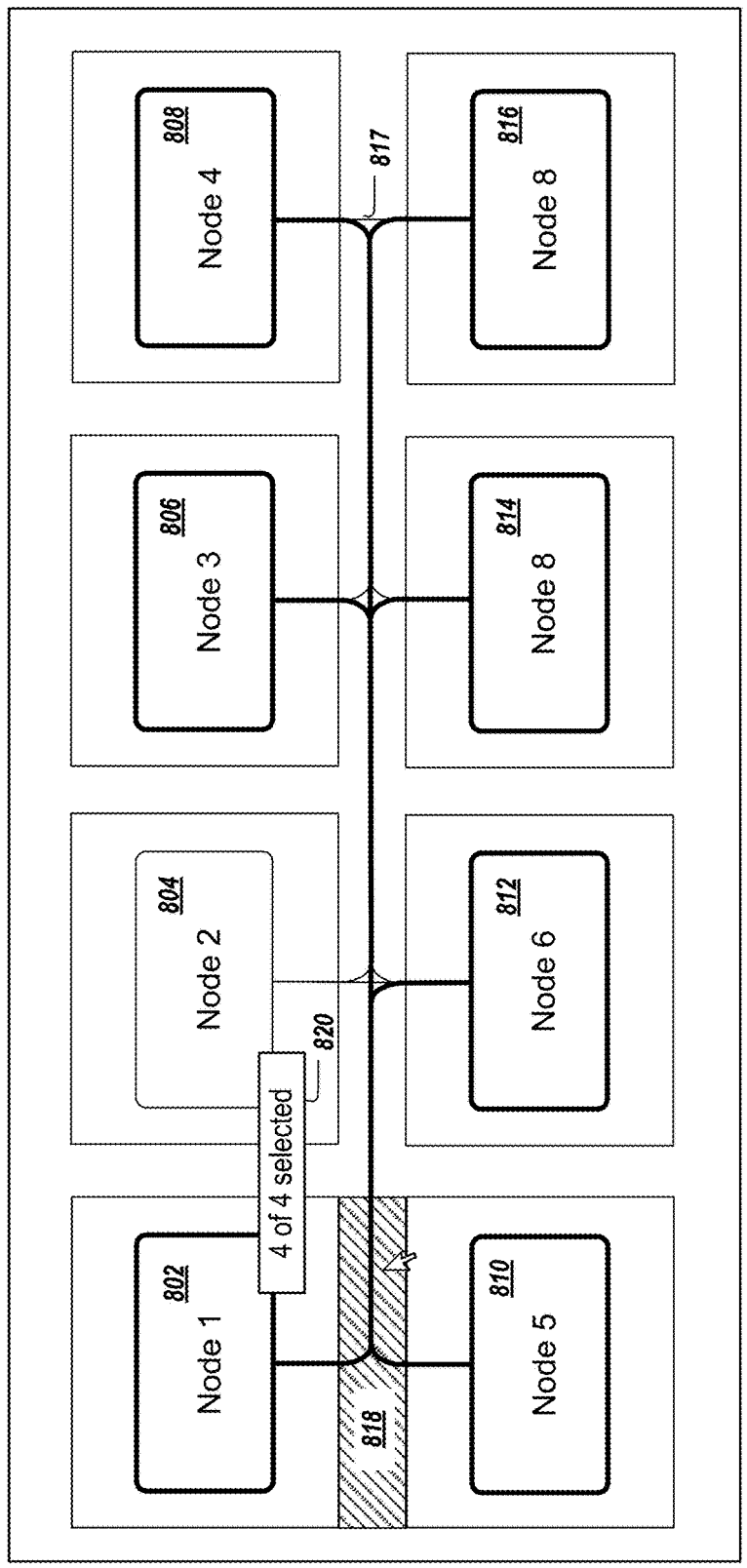
FIG. 8 illustrates selection of connections in a model.

FIG. 8 illustrates selection of connections in a model 800. Nodes 802-816 correspond to the nodes 602-616. Various selection operations can be supported. For example, the user can select a given node (e.g., the node 804), by performing a selection operation (e.g., click, tap) on the given node. As another example, the user can select a given, non-overlapped connection (e.g., a connection 817), by performing a selection operation on the given connection. In some implementations, when a single connection is selected, the nodes associated with that connection are also selected. A selected item (e.g., node, connection) or set of selected items can be highlighted by being shown in a different style (e.g., different color, background, border, line width, line style, etc.) as compared to unselected items.

In general, the modeling application enables selection of areas (e.g., an area 818 as described below) or items (e.g., single nodes, connections) that are sufficiently large for the user to easily select using various types of devices. When connections are overlapped or if a connection segment (e.g., the middle of the connection 817) is adjacent to other connection segments, multiple-selection and selection-refinement operations can be supported.

For example, assuming a starting state as shown in FIG. 7 with no items selected, the user can select an area 818 that is between the node 802 and the node 810 in order to select connections that pass through the area 818. In response to the selection, all connections that pass through the area 818 can be shown in a selected style (e.g., a darker and/or thicker line than un-selected connections). A message 820 indicates that all five of five connections that pass through the area 818 are selected. Additionally, all nodes that are connected to a connection that passes through the area 818 are shown as selected. The node 804 is shown as not selected, which indicates that the node 804 is not connected to a connection that passes through the area 818. As described below, the user can refine the selection to select a subset of currently-selected connections. As another example of selection, the user can select a portion 821 of an overlapped connection, which can result in selection of (e.g., all five of) the connections that are represented by the overlapped connection.

Figure 9:
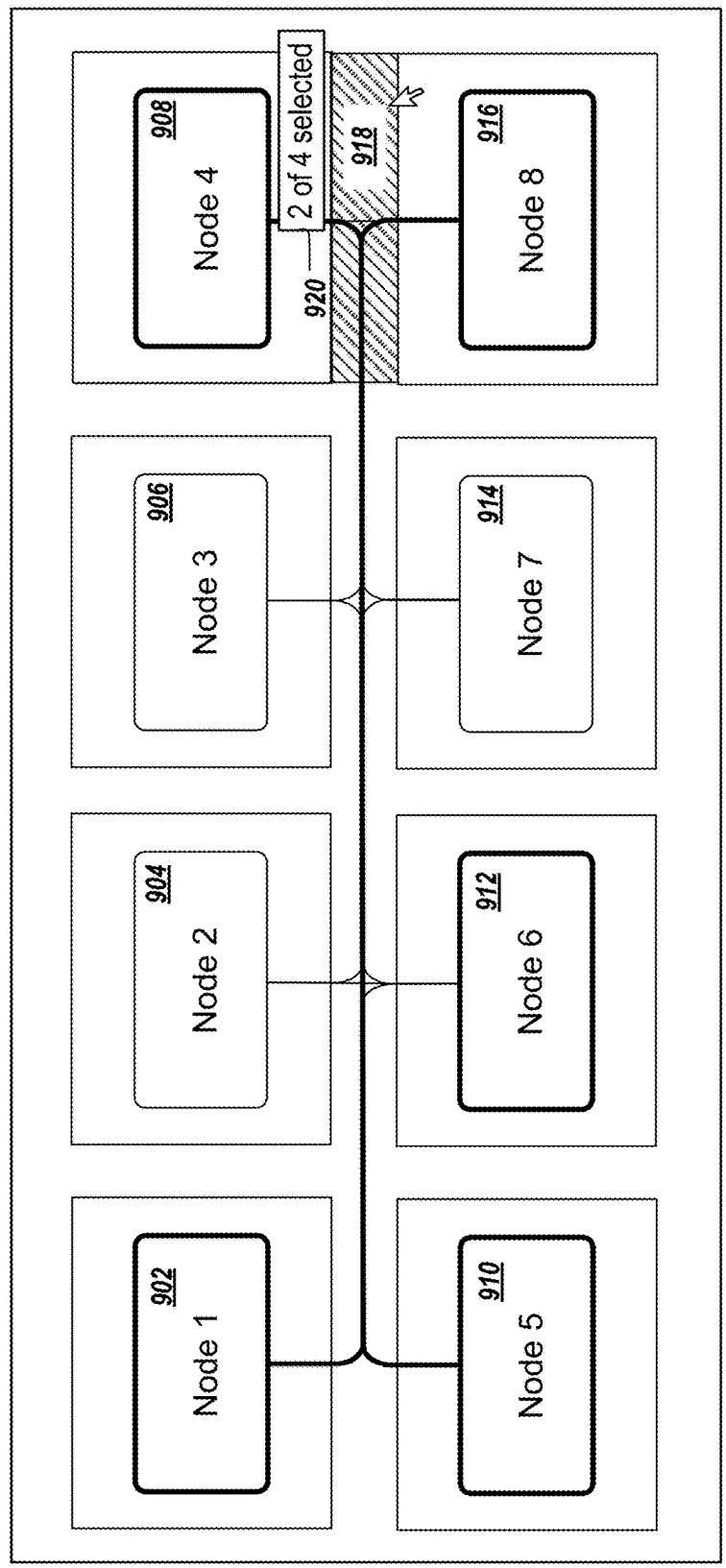
FIG. 9 illustrates refinement of selection of connections in a model.

FIG. 9 illustrates refinement of selection of connections in a model 900. Nodes 902-916 correspond to the nodes 802-816 described above with respect to FIG. 8. An area 918 corresponds to the previously selected area 818 described above with respect to FIG. 8. The user can perform a second selection operation after the selection operation described in FIG. 8. For example, the user can select an area 919 between the node 908 and the node 916.

In some implementations, the second selection operation can be identified as a selection refinement operation which is to further refine a previous, first selection. The selection refinement operation can be distinguished from a restart-selection operation which is to clear any previous selections. For example, on a client device for which a mouse input device is used, the user can indicate a selection refinement operation by holding down a predefined key (e.g., a SHIFT key, a control key) while performing a click operation with the mouse. The restart-selection operation can be initiated, for example, using a mouse click without pressing a predefined key. As another example, on a client device that uses touch input, the restart-selection operation can be indicated by a single tap input and the selection refinement operation can be indicated by a double tap input.

In response to the user performing the selection refinement operation, the model 900 can be updated to show the selection of connections that pass through both the area 918 and the area 919. A message 920 indicates that the selection refinement operation has resulted in the selection of two of the six connections that pass through the last-selected area 919.

Figure 10:
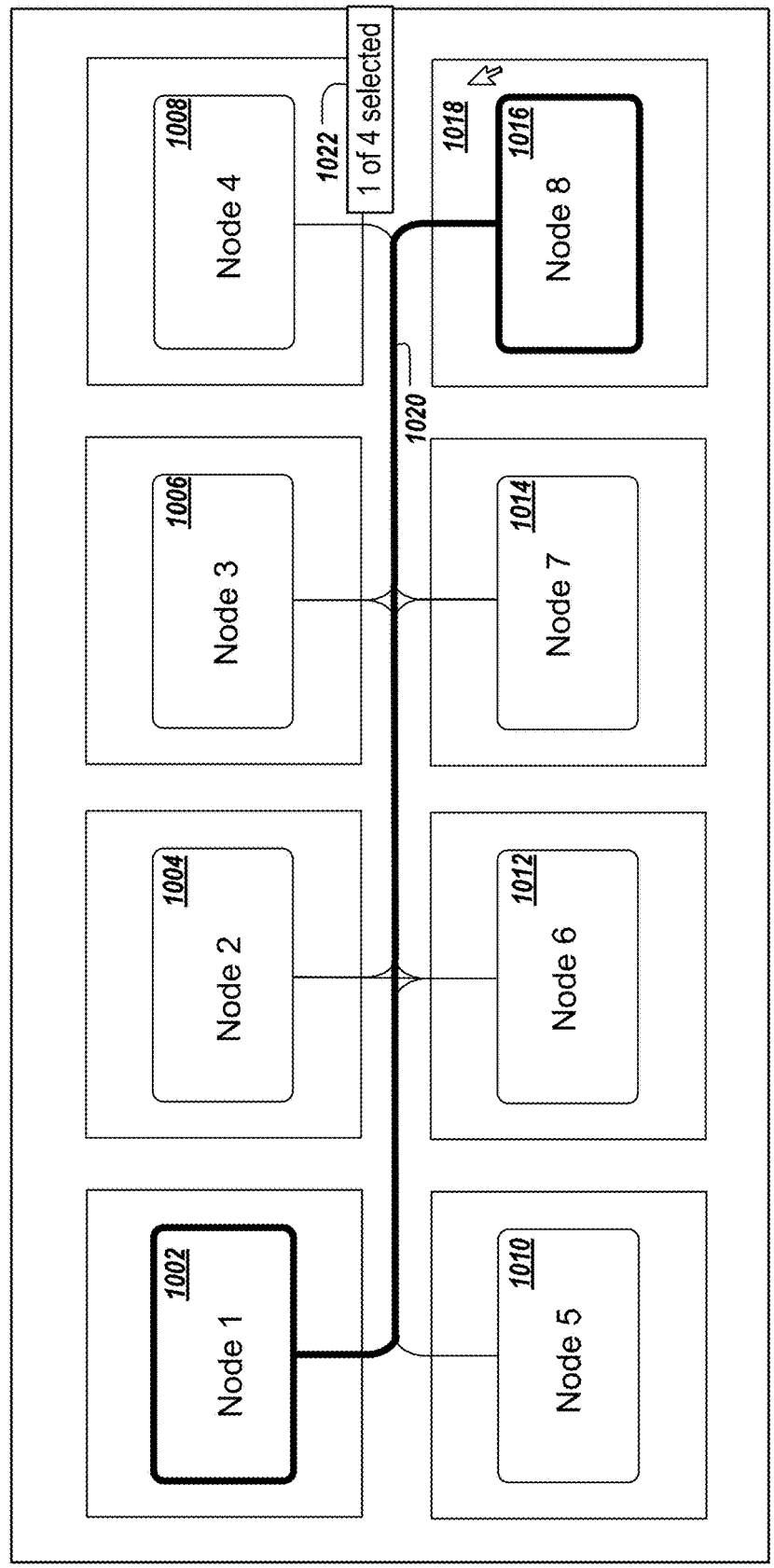
FIG. 10 illustrates further refinement of selection of connections in a model.

FIG. 10 illustrates further refinement of selection of connections in a model 1000. Nodes 1002-1016 correspond to the nodes 902-916 described above with respect to FIG. 9. Areas 1018 and 1019 correspond to the areas 918 and 919 described above with respect to FIG. 9. Assuming a user interface state shown in FIG. 9 that shows the result of two selection operations, the user can perform a third selection operation (e.g., another selection refinement operation) by selecting a halo area 1020 that surrounds the node 1016. In response, the model 1000 can be updated to show as selected the node 1002, the node 1016, and a connection 1022 that connects those two nodes. The second selection refinement operation of selecting the halo 1020 associated with the node 1016 refines a current selection (which is connections that pass through both the areas 1018 and 1019) to include those connections that are currently selected that have an endpoint at the node 1016. A message 1024 indicates that one of the four connections that have an endpoint at the node 1016 are currently selected.

Figure 11:
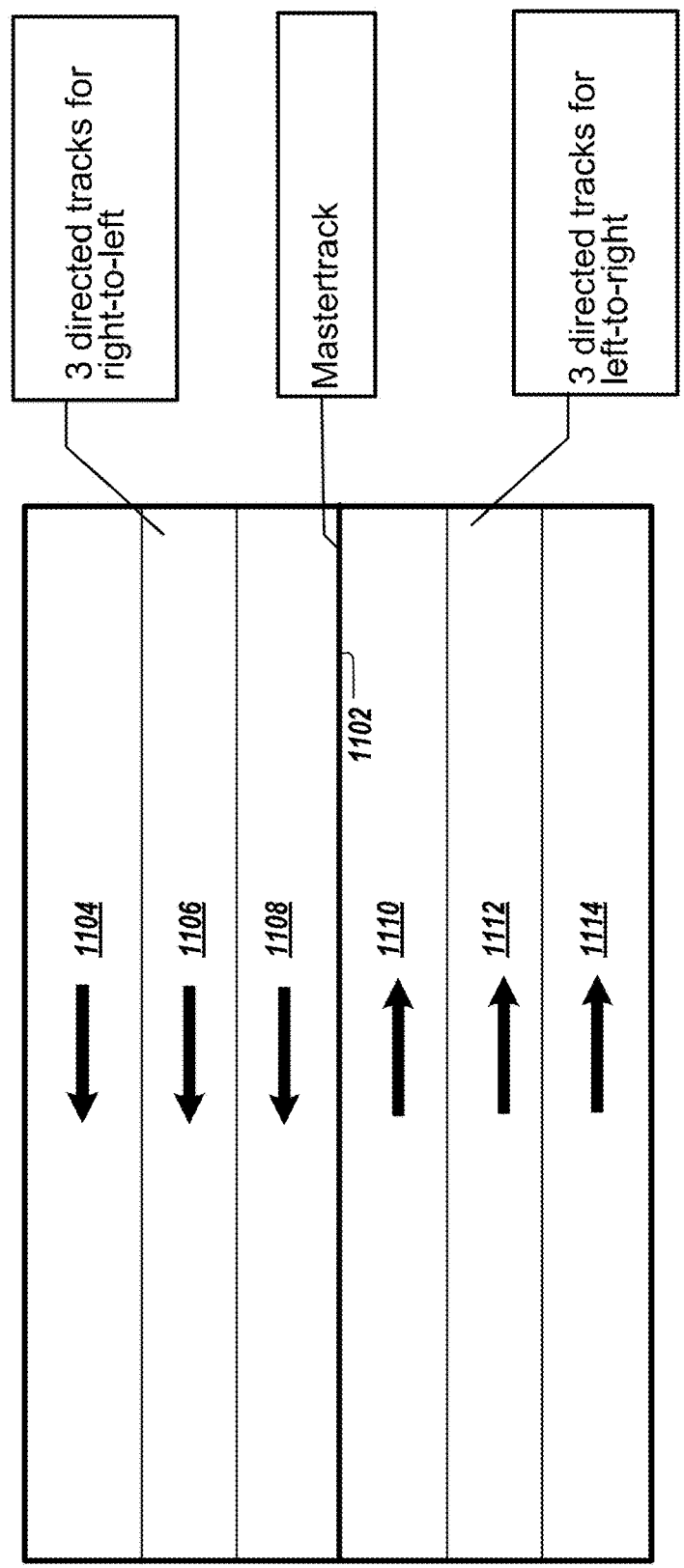
FIG. 11 illustrates a master track and associated directed tracks.

FIG. 11 illustrates a master track 1102 and associated directed tracks. A user may desire to see all connections between nodes, such as when viewing a model on a client device or when viewing a printed model. As another example, the user may desire to scroll or zoom the model and may desire to see some or all overlapping connections, such as depending on a current zoom level. To enable the viewing of some or all overlapping connections, a modeling application can display the master track 1102 and a set of right-to-left directed tracks 1104, 1106, and 1108 above the master track 1102 and a set of left-to-right directed tracks 1110, 1112, and 1114 below the master track 1102. As described in more detail below, the master track 1102 can be used to show connections that are shown as overlapped at a current level of detail. One or more of the right-to-left directed tracks 1104, 1106, and 1108, and/or the left-to-right directed tracks 1110, 1112, and 1114 can be used to reveal one or more overlapped connections and display them as non-overlapped connections.

Figure 12:
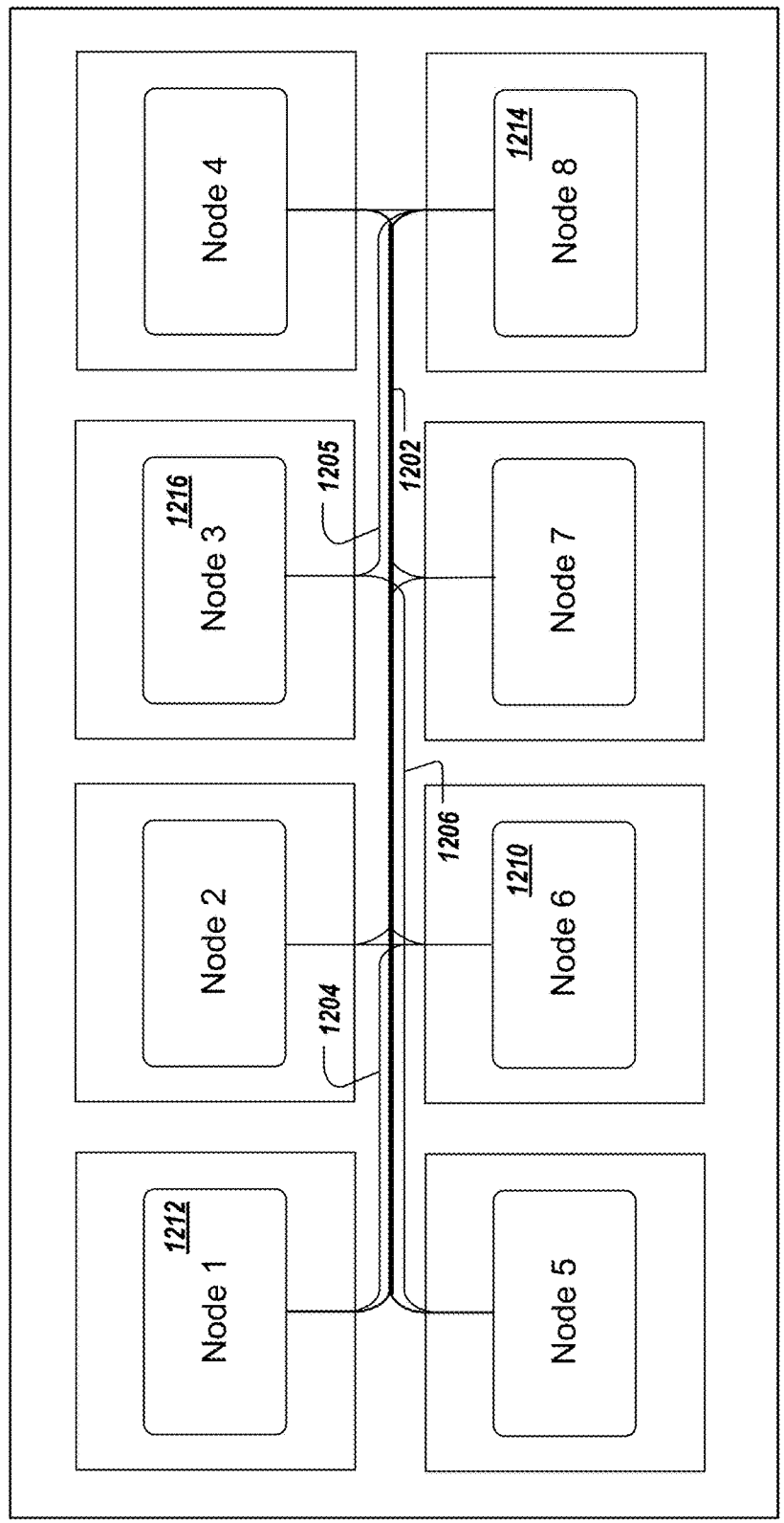
FIG. 12 is a model that includes a master track and associated directed tracks.

FIG. 12 is a model 1200 that includes a master track 1202 and associated directed tracks. Assuming an initial state as shown in FIG. 7, a user may zoom out one level (e.g., using a mouse wheel, a pinch touch gesture, or some other input) to reveal one or more overlapping connections. In response to the zoom-out operation, the model 1200 can be updated to display the master track 1202, a right-to-left directed track above the master track 1202 (shown in a first portion 1204 and a second portion 1205), and a left-to-right directed track 1206 below the master track 1202. The first portion 1204 of the right-to-left directed track is a connection from a node 1210 to a node 1212. The second portion 1205 of the right-to-left directed track is a connection from a node 1214 to a node 1216.

Different, separate connections and/or different, separate connection segments can be shown in a same directed track if there is available space in a respective directed track to show the different, separate connections or connection segments. The master track 1202 can be shown in a different style (e.g., darker and/or thicker line) to indicate that the master track 1202 represents additional overlapping connections that are not shown in the right-to-left directed track portions 1204 and 1205 or the left-to-right directed track 1206. The user can reveal additional overlapping connections, to be shown in additional directed tracks, as described below.

Figure 13:
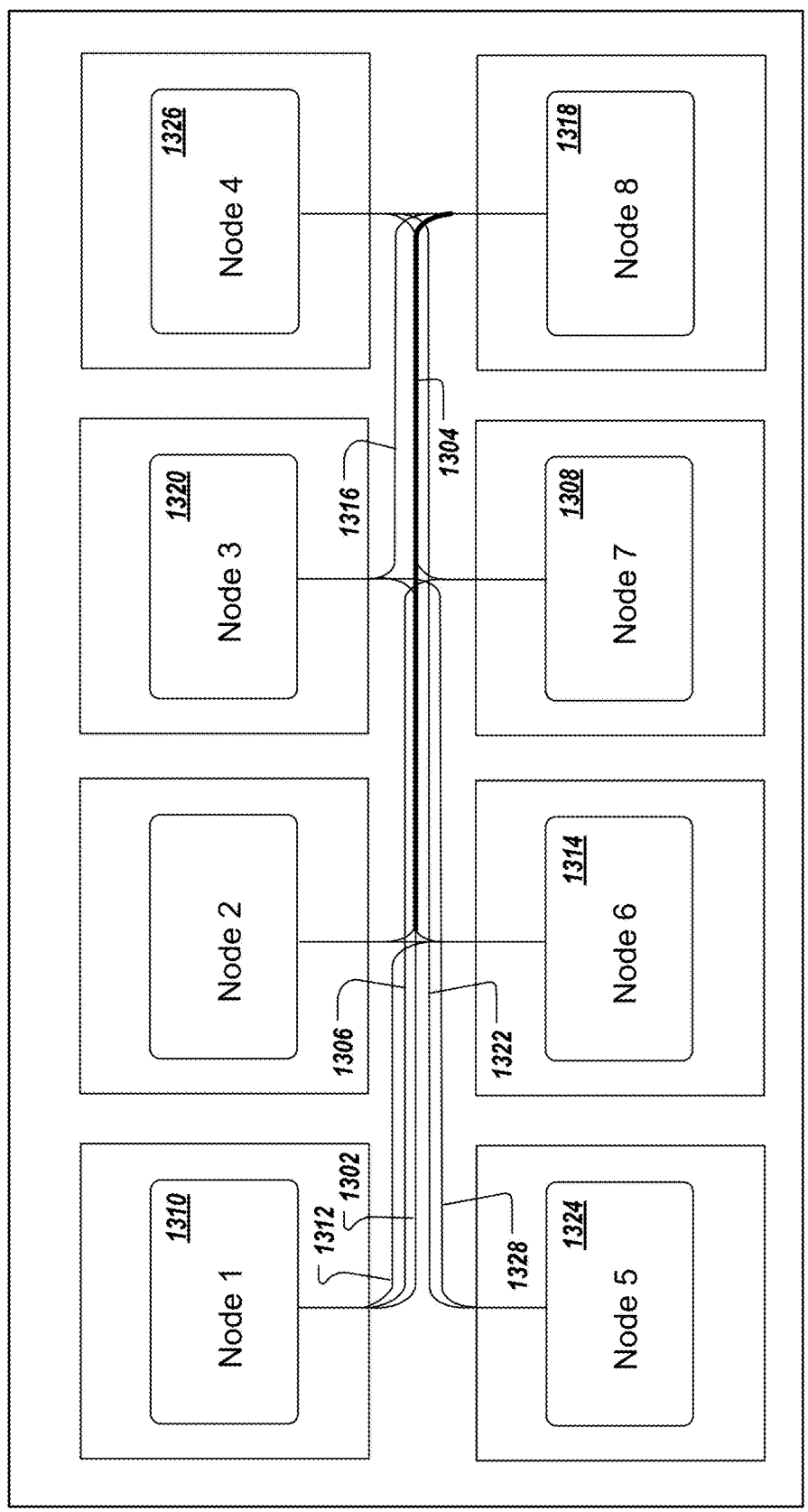
FIGS. 13-15 illustrate the displaying of additional directed tracks in a model.

FIG. 13 illustrates the displaying of additional directed tracks in a model 1300. Assuming a user interface state as shown in FIG. 12, the user may perform an additional zoom-out operation to reveal additional overlapped connections. The revealed overlapped connections can be displayed in new, additional directed tracks above or below a master track. The master track is shown in a first portion 1302 and a second portion 1304. The model 1300 includes a first right-to-left directed track that includes a connection 1306 connecting a node 1308 to a node 1310. The model 1300 includes a second right-to-left directed track that includes a connection 1312 connecting a node 1314 to the node 1310 and a connection 1316 connecting a node 1318 to a node 1320. The model 1300 includes a first left-to-right directed track that includes a connection 1322 connecting a node 1324 to a node 1326 and a second left-to-right directed track that includes a connection 1328 connecting the node 1324 to the node 1320.

The first portion 1302 of the master track is displayed in a thinner line than the second portion 1304. The thinner line of the first portion 1302 indicates that there are no longer any overlapping connections or connection segments in the first portion 1302. The thicker line of the second portion 1304 of the master track indicates that the second portion 1304 represents a set of two or more overlapping connections or connection segments (which can be revealed by yet another zoom-out operation, as described below).

Figure 14:
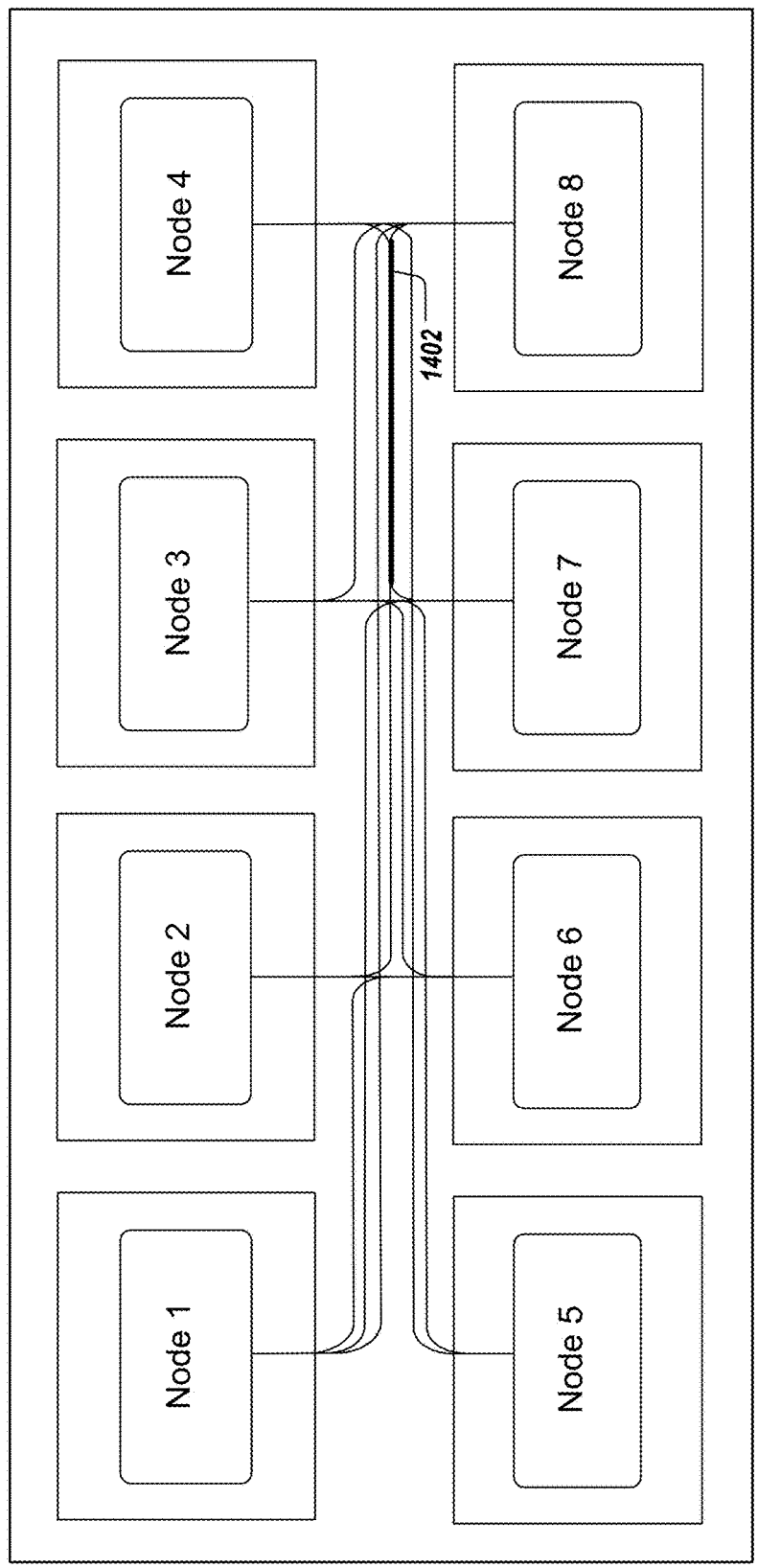

FIG. 14 illustrates the displaying of additional directed tracks in a model 1400. The model 1400 shows additional directed tracks as compared to the model 1300 in response to a further zoom-out user input. A master track portion 1402 indicates that the model 1400 still includes overlapped connections or connection segments, which can be revealed with still one more zoom-out operation, as described below.

Figure 15:
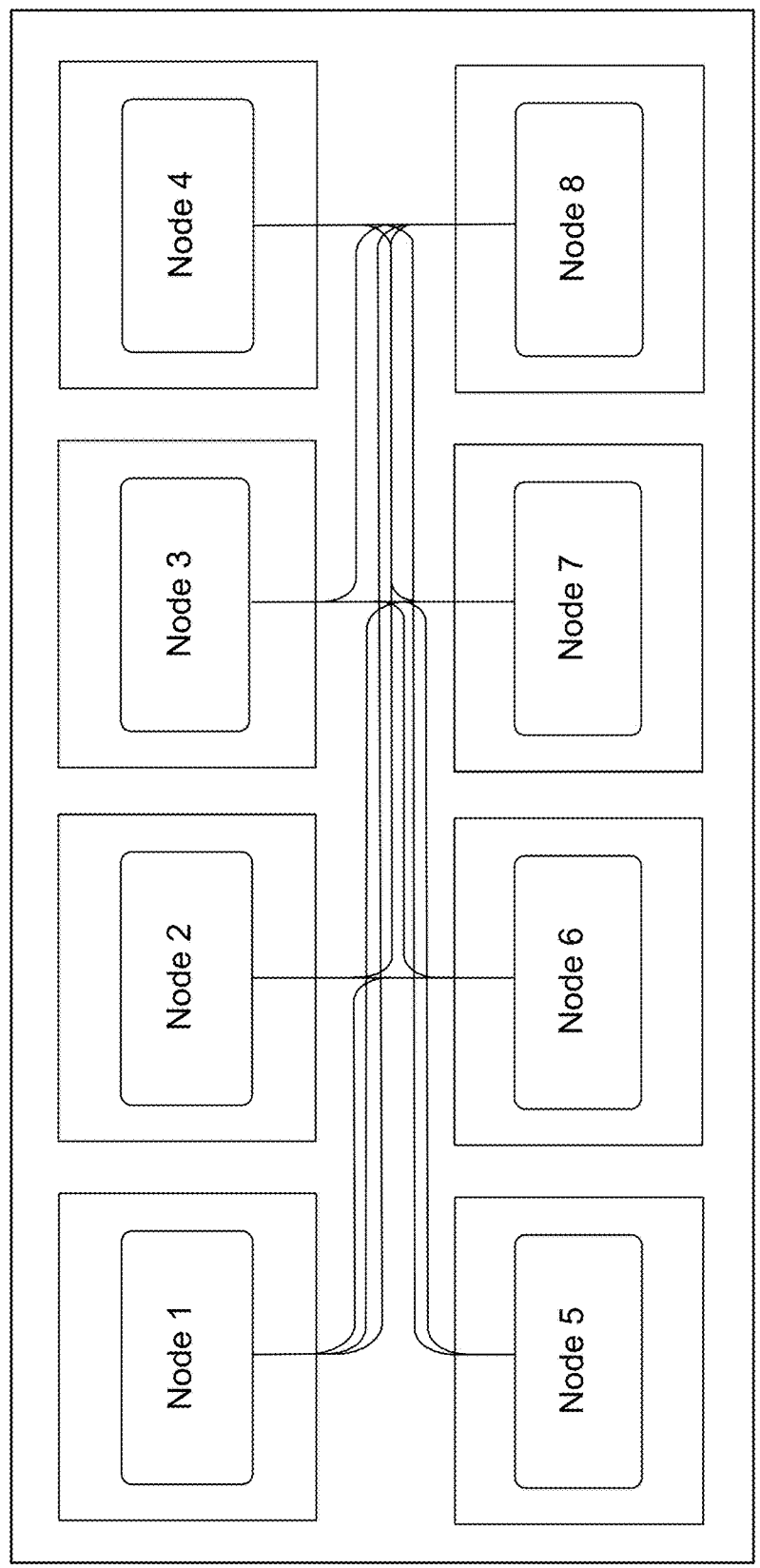

FIG. 15 illustrates the displaying of additional directed tracks in a model 1500. The model 1500 shows additional directed tracks as compared to the model 1400 in response to a further zoom-out user input. The model 1500 no longer includes a master track, which indicates that no further overlapped connections or connection segments are displayed in the model 1500. The user can perform one or more zoom-in operations to show less directed tracks as shown in the model 1500 (which can result in the master track reappearing to represent now overlapped connections). In some implementations, a maximum number of directed tracks may be shown on a model. For example, a modeling application may be configured to show at most three right-to-left directed tracks and three left-to-right directed tracks.

Figure 16:
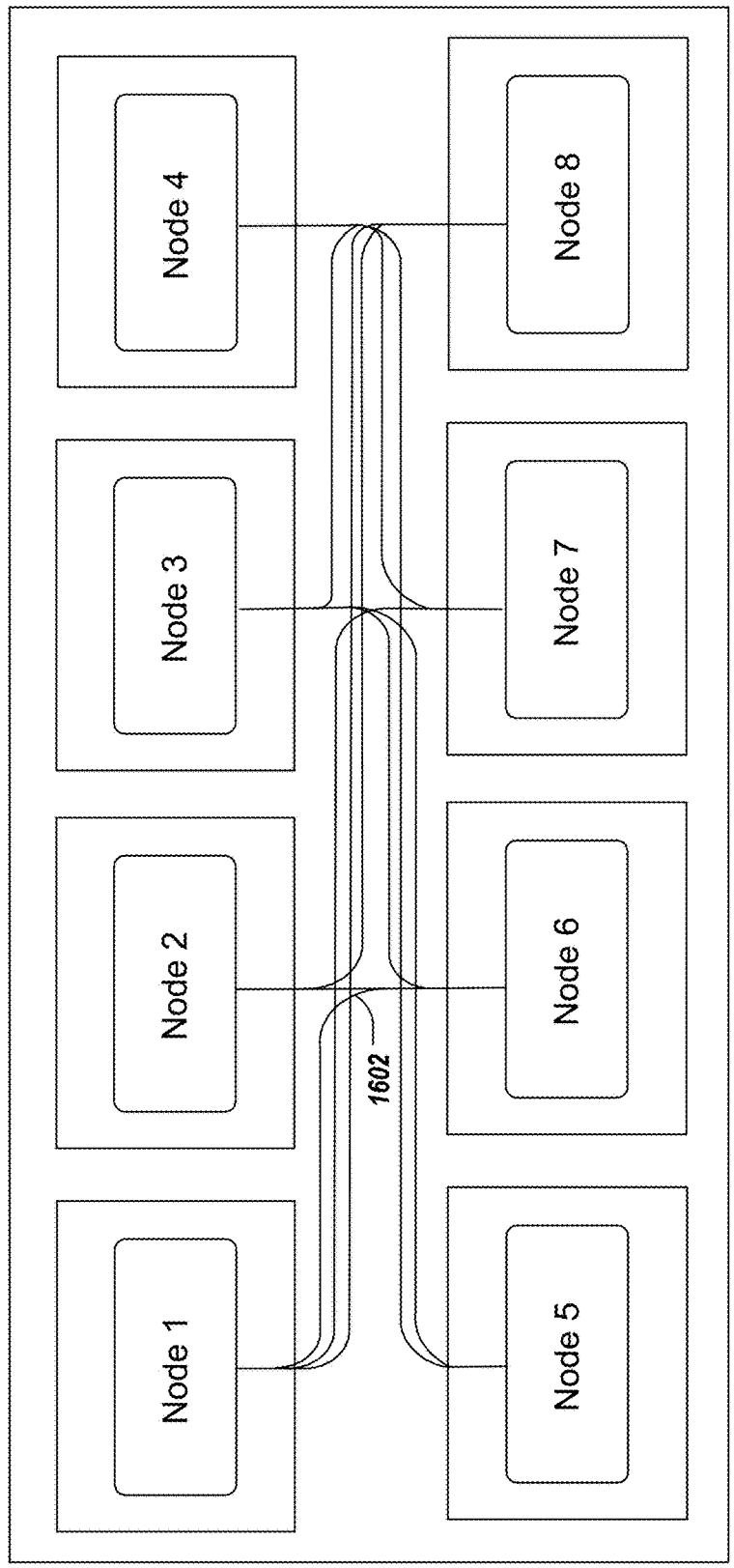
FIG. 16 is a model in which connections are rounded differently to improve appearance of the connections.

FIG. 16 is a model 1600 in which connections are rounded differently to improve appearance of the connections. To improve appearance, different rounding amounts can be applied to one or more connections of the model 1600, to enable a user to more easily see the nodes that correspond to a given connection. For example, additional rounding is applied to a segment of a connection 1602 as compared to a corresponding connection in the model 1500 of FIG. 15. A rounding amount and a direction of the rounding can be based on a distance of a connection to a master track and the direction of the connection.

Figure 17:
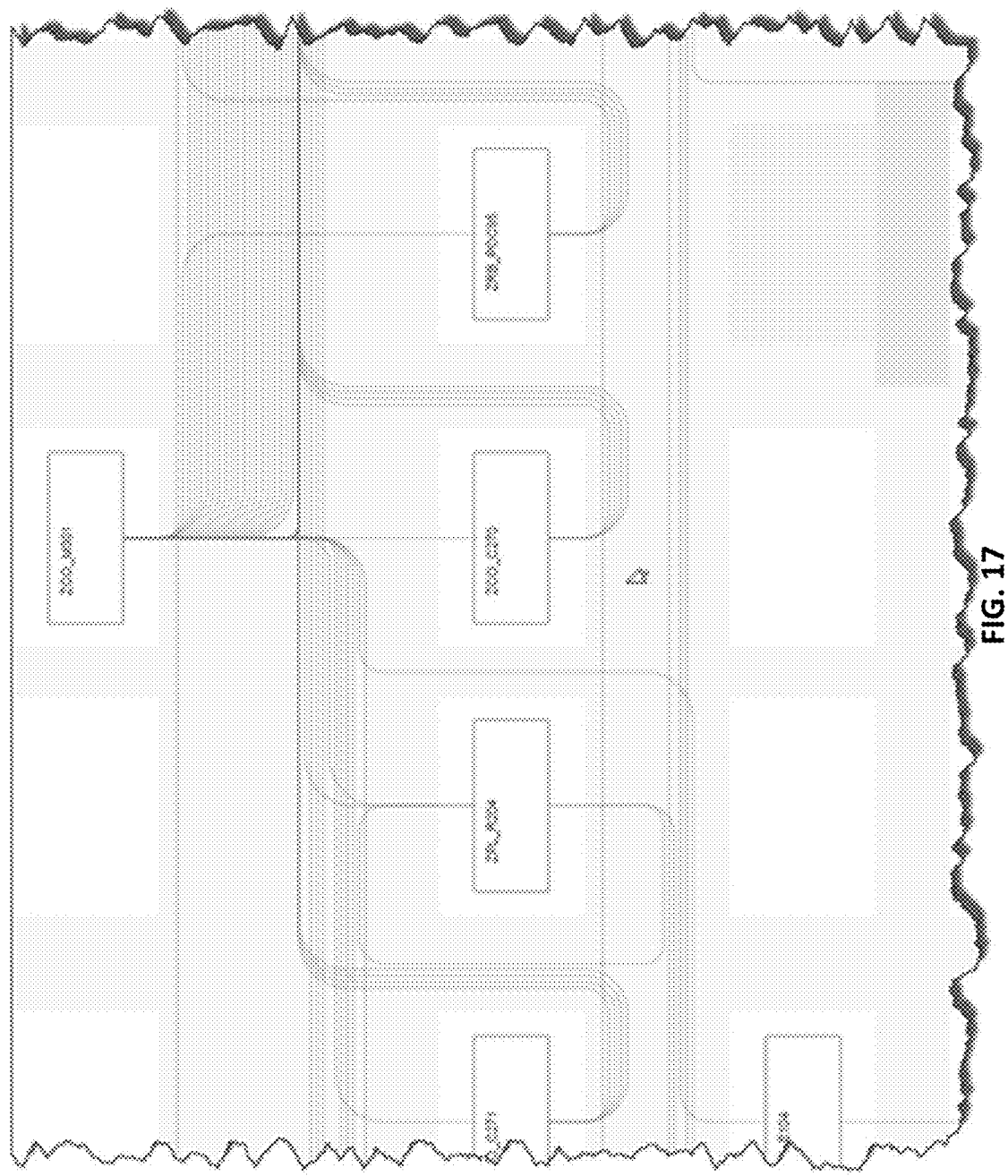
FIG. 17 illustrates the presentation of a portion of a complex model using directed tracks.

FIG. 17 illustrates the presentation of a portion 1700 of a complex model using directed tracks. Showing connections in directed tracks can enable the showing of all connections on a model, which can be useful, for example, if the user desires to print the model with all connections visible.

Figure 18:
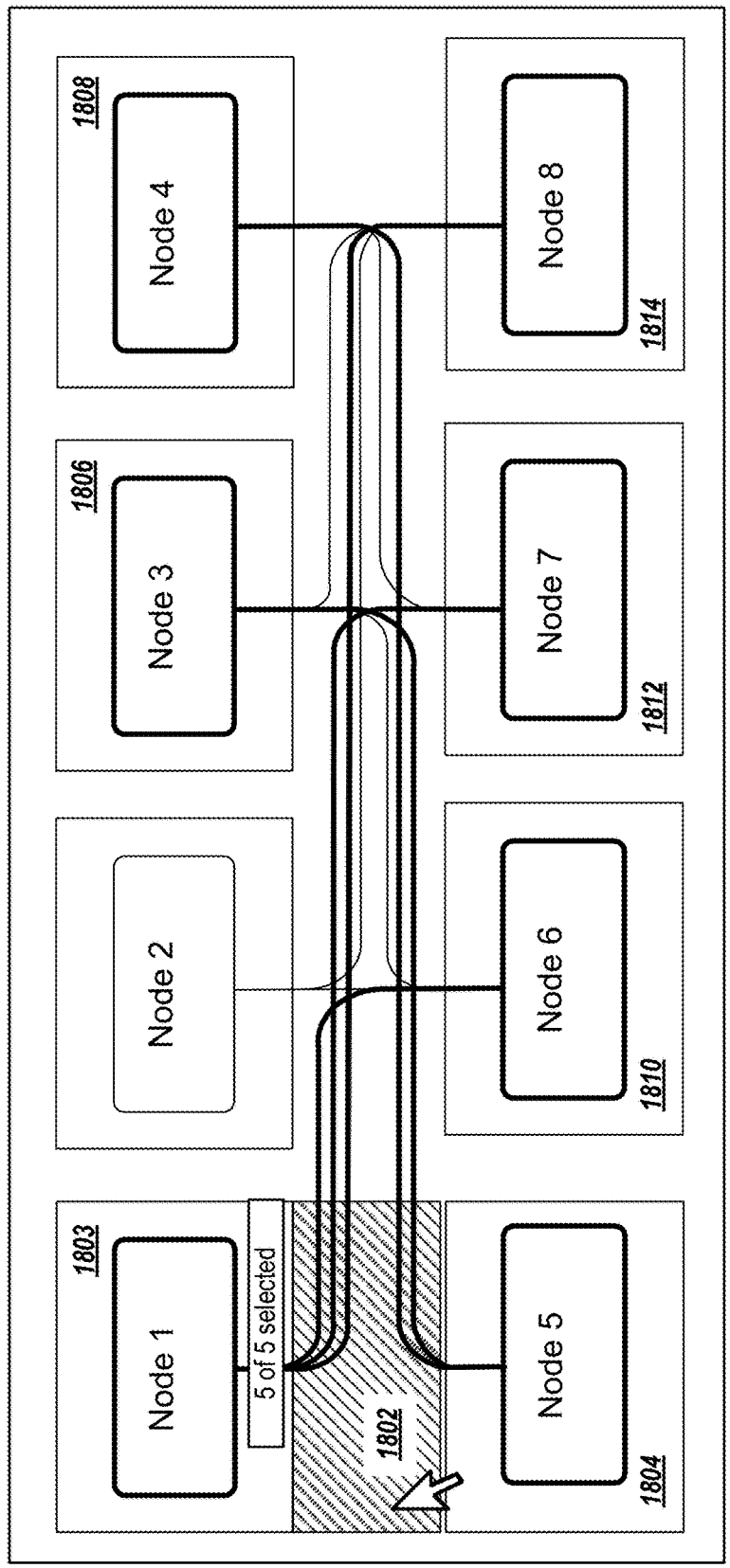
FIG. 18 illustrates selection of connections in a model.

FIG. 18 illustrates selection of connections in a model 1800. When directed tracks are displayed in the model 1800 (as shown), the user can perform selection operations as described above. For example, the user can select an area 1802 that is between a node 1803 and a node 1804, similar to the description of FIG. 8 above. In response to the selection of the area 1802, connections that pass through the area 1802 can be selected, as well as the nodes that are the endpoints of such connections. For example, the node 1803, the node 1804, and nodes 1806, 1808, 1810, 1812, and 1814 are selected.

Figure 19:
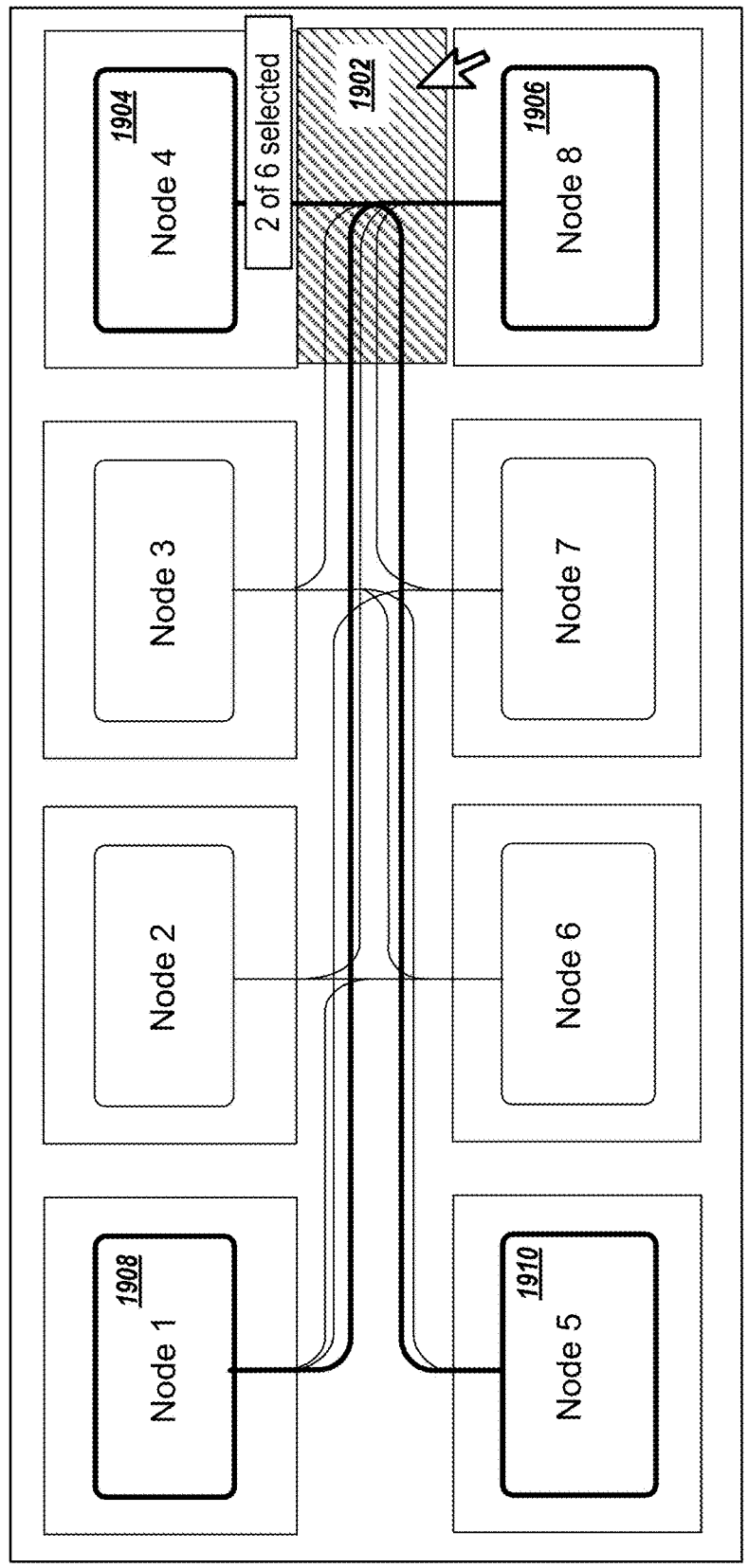
FIG. 19 illustrates refinement of selection of connections in a model.

FIG. 19 illustrates refinement of selection of connections in a model 1900. Similar to the description of FIG. 9 above, the user can refine a selection of connections that are displayed in one or more directed tracks. The user can perform a selection refinement operation by selecting an area 1902 between a node 1904 and a node 1906. In response to the user performing the selection refinement operation, the model 1900 can be updated to show the selection of two connections 1908 and 1910 that pass through both the area 1902 and a previously selected area 1912.

Figure 20:
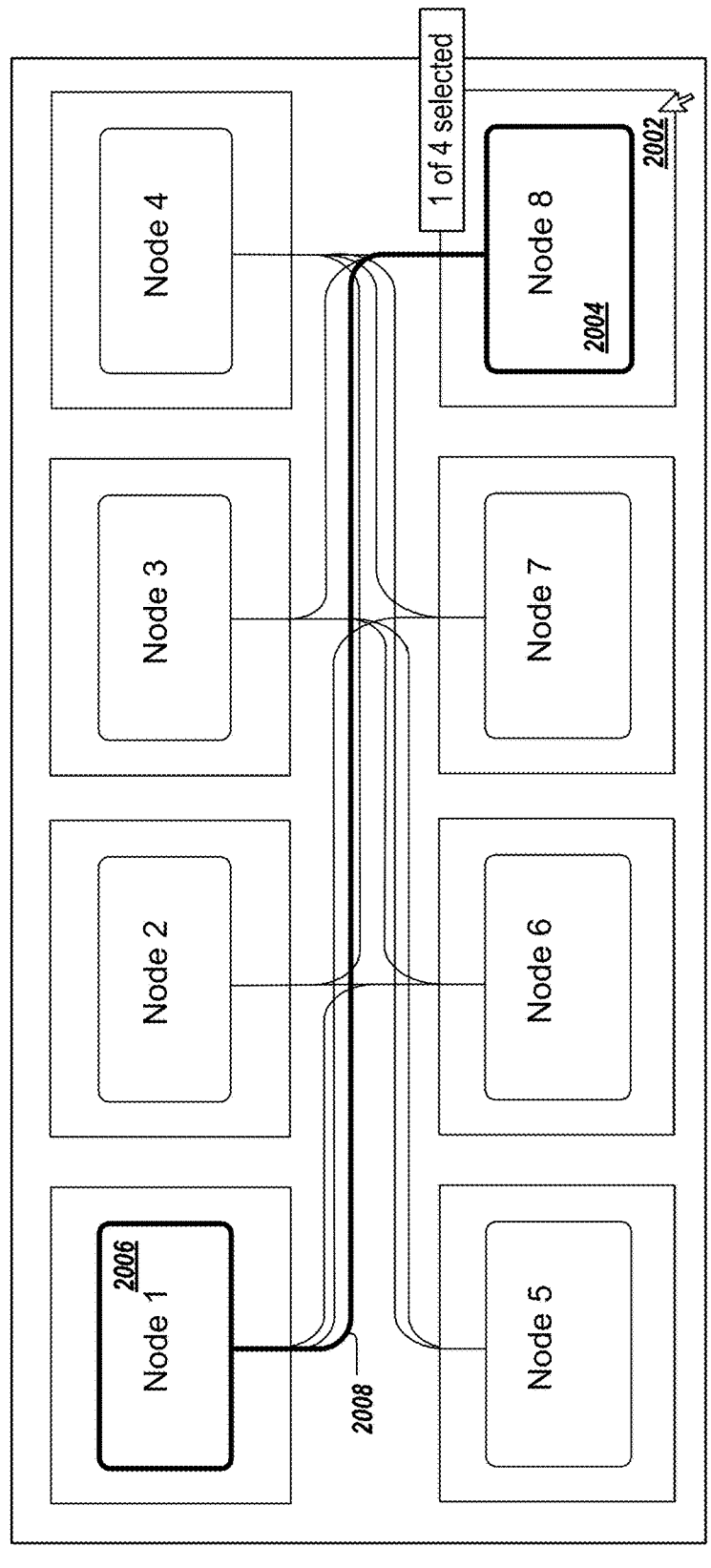
FIG. 20 illustrates further refinement of selection of connections in a model that includes directed tracks.

FIG. 20 illustrates further refinement of selection of connections in a model 2000 that includes directed tracks. Similar to the description of FIG. 10 above, the user can further refine a selection of connections that are displayed in one or more directed tracks. The user can perform a selection refinement operation by selecting a halo area 2002 that surrounds a node 2004. In response, the model 2000 can be updated to show as selected a connection 2005, which is the one connection out of four connections that connect to the node 2004 that also passes through previously selected areas 2006 and 2008.

Figure 21:
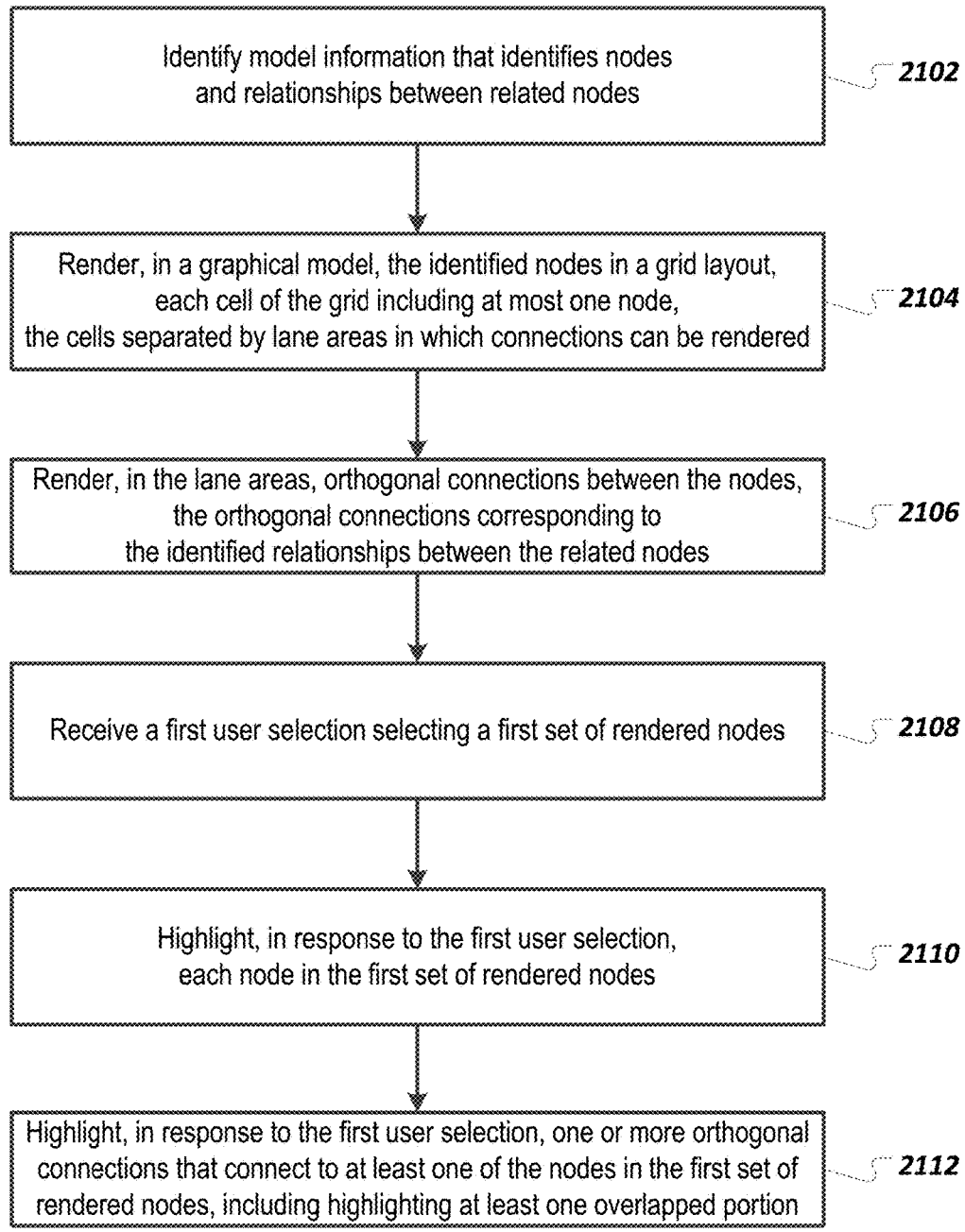
FIG. 21 is a flowchart of an example method for a grid-based rendering of nodes and relationships between nodes.

FIG. 21 is a flowchart of an example method 2100 for a grid-based rendering of nodes and relationships between nodes. It will be understood that method 2100 and related methods may be performed, for example, by any suitable system, environment, software, and hardware, or a combination of systems, environments, software, and hardware, as appropriate. For example, one or more of a client, a server, or other computing device can be used to execute method 2100 and related methods and obtain any data from the memory of a client, a server, or the other computing device. In some implementations, the method 2100 and related methods are executed by one or more components of the system 200 described above with respect to FIG. 2. For example, the method 2100 and related methods can be executed by the modeling application 210 and/or the modeling application 213 of FIG. 2.

At 2102, model information that identifies nodes and relationships between related nodes is identified. The model information can be for a class model, a database model, or some other type of model.

At 2104, the identified nodes are rendered, in a graphical model, in a grid layout. Each cell of the grid includes at most one node. The cells are separated by lane areas in which connections can be rendered. Cells including a node can include a halo area around the respective node.

In one or more view modes, such as a print mode or a zoomed-out mode, the lane areas can include multiple tracks including a master track and a set of directed tracks. Each directed track can be used for showing a single non-overlapped connection. The directed tracks can include a set of right-to-left directed tracks in which connections are directed from right to left from a source node to a target node. The directed tracks can include a set of left-to-right directed tracks in which connections are directed from left to right from a source node to a target node. The master track can be used for showing overlapped connection portions.

At 2106, orthogonal connections between the nodes are rendered, in the lane areas. The orthogonal connections correspond to the identified relationships between the related nodes. One or more portions of the orthogonal connections are overlapped when two or more orthogonal connections are drawn in a same lane area. The orthogonal connections, the rendered nodes, the lane areas, and the halo areas can each be selectable items.

At 2108, a first user selection of a first selectable item is received. For example, a user can select a given node. As another example, the user can select a lane area that separates two nodes. Other examples include the user selecting a halo area or an overlapped or non-overlapped connection portion.

At 2110, orthogonal connections and nodes that are associated with the first selectable item are highlighted, in response to the first user selection. Highlighting can include applying a style, such as a boundary style (e.g., colored line, thicker line, dashed line) to a node or a connection. Highlighting can also include the use of fill colors or gradients.

If the first selectable item is a node, the node can be highlighted. If the first selectable item is a non-overlapped connection portion, the connection that includes the non-overlapped connection portion can be highlighted. If the first selectable item is a halo area, the connections that connect to the node associated with the halo area can be highlighted. If the first selectable item is an overlapped connection portion, the connections that include the overlapped connection portion can be highlighted. If the first selectable item is a lane area, connections that pass through the lane area can be highlighted. After receiving the first user selection, a second user section selecting a second selectable item can be received. In response to the second user selection, highlighting of one or more orthogonal connections or nodes that are associated with the first user selection but that are not associated with the second selectable item can be removed.

The preceding figures and accompanying description illustrate example processes and computer-implementable techniques. But system 200 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 200 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method comprising:
   identifying model information that identifies nodes and relationships between related nodes;
   rendering, in a graphical model, the identified nodes in a grid layout, wherein each cell of the grid includes at most one node, and wherein the cells are separated by lane areas in which connections can be rendered;
   rendering, in the lane areas, orthogonal connections between the nodes, the orthogonal connections corresponding to the identified relationships between the related nodes, wherein one or more portions of the orthogonal connections are overlapped in a common portion when two or more orthogonal connections are drawn in a same lane area and wherein the orthogonal connections, the rendered nodes, and the lane areas comprise selectable items;
   receiving a first user selection of a first selectable item, as a first selected item;
   highlighting, in response to the first user selection, orthogonal connections and nodes that are associated with the first selected item, including highlighting a second selectable item and a third selectable item;
   receiving, after the first user selection, and while the second selectable item and the third selectable item are highlighted, a second user selection selecting a fourth selectable item as a second selected item;

determining that the second selectable item is associated with both the first selected item and the second selected item;
maintaining highlighting of the second selectable item based on determining that the second selectable item is associated with both the first selected item and the second selected item;
determining that the third selectable item is associated with the first selected item but not associated with the second selected item; and
removing highlighting from the third selectable item based on determining that the third selectable item is associated with the first selected item but not associated with the second selected item.

2. The method of claim 1, wherein:
the first user selection comprises a selection of a first lane area portion between a first node and a second node,
the second selectable item and the third selectable item that are highlighted in response to the first user selection are orthogonal connections that pass through the first lane area portion, and
the second selectable item and the third selectable item share a common overlapped portion.

3. The method of claim 1, further comprising applying different rounding to one or more orthogonal connection portions to provide insight as to which nodes are associated with which connections.

4. The method of claim 1, wherein highlighting orthogonal connections and nodes that are associated with the first selected item includes applying one or more styles which indicate a number of connections that include the common portion.

5. The method of claim 1, wherein the lane areas comprise multiple tracks, the multiple tracking including a master track and a set of directed tracks, each directed track for showing a single non-overlapped connection and the master track for showing overlapped connection portions.

6. The method of claim 5, further comprising:
receiving a zoom-out input; and
in response to the zoom-out input, moving one or more overlapped connections from the master track to respective directed tracks.

7. The method of claim 5, further comprising:
receiving a zoom-in input; and
in response to the zoom-in input, moving one or more non-overlapped connections from one or more respective directed tracks to the master track, as overlapped connections.

8. The method of claim 6, wherein the master track is empty after moving the one or more overlapped connections from the master track to the respective directed tracks.

9. The method of claim 5, further comprising:
receiving a third user selection selecting a fifth selectable item; and
highlighting, in response to the third user selection, each connection that is associated with the fifth selectable item, including highlighting at least one non-overlapped connection in a directed track and at least one overlapped connection in the master track.

10. The method of claim 1, wherein the first user selection comprises selection of the overlapped portion and the orthogonal connections that are associated with the first user selection comprise connections that include the overlapped portion.

11. The method of claim 1, wherein the cells including a node include a halo area around the respective node, the first user selection comprises selection of a first halo area, and the orthogonal connections that are associated with the first user selection comprise connections that connect to the node associated with the first halo area.

12. A system comprising:
one or more computers; and
a computer-readable medium coupled to the one or more computers having instructions stored thereon which, when executed by the one or more computers, cause the one or more computers to perform operations comprising:
identifying model information that identifies nodes and relationships between related nodes;
rendering, in a graphical model, the identified nodes in a grid layout, wherein each cell of the grid includes at most one node, and wherein the cells are separated by lane areas in which connections can be rendered;
rendering, in the lane areas, orthogonal connections between the nodes, the orthogonal connections corresponding to the identified relationships between the related nodes, wherein one or more portions of the orthogonal connections are overlapped in a common portion when two or more orthogonal connections are drawn in a same lane area and wherein the orthogonal connections, the rendered nodes, and the lane areas comprise selectable items;
receiving a first user selection of a first selectable item, as a first selected item;
highlighting, in response to the first user selection, orthogonal connections and nodes that are associated with the first selected item, including highlighting a second selectable item and a third selectable item;
receiving, after the first user selection, and while the second selectable item and the third selectable item are highlighted, a second user selection selecting a fourth selectable item as a second selected item;
determining that the second selectable item is associated with both the first selected item and the second selected item;
maintaining highlighting of the second selectable item based on determining that the second selectable item is associated with both the first selected item and the second selected item;
determining that the third selectable item is associated with the first selected item but not associated with the second selected item; and
removing highlighting from the third selectable item based on determining that the third selectable item is associated with the first selected item but not associated with the second selected item.

13. The system of claim 12, wherein:
the first user selection comprises a selection of a first lane area portion between a first node and a second node,
the second selectable item and the third selectable item that are highlighted in response to the first user selection are orthogonal connections that pass through the first lane area portion, and the second selectable item and the third selectable item share a common overlapped portion.

14. The system of claim 12, wherein highlighting orthogonal connections and nodes that are associated with the first selected item includes applying one or more styles which indicate a number of connections that include the common portion.

15. The system of claim 12, wherein the lane areas comprise multiple tracks, the multiple tracking including a master track and a set of directed tracks, each directed track for showing a single non-overlapped connection and the master track for showing overlapped connection portions.

16. A computer program product encoded on a non-transitory storage medium, the product comprising non-transitory, computer readable instructions for causing one or more processors to perform operations comprising:

identifying model information that identifies nodes and relationships between related nodes;

rendering, in a graphical model, the identified nodes in a grid layout, wherein each cell of the grid includes at most one node, and wherein the cells are separated by lane areas in which connections can be rendered;

rendering, in the lane areas, orthogonal connections between the nodes, the orthogonal connections corresponding to the identified relationships between the related nodes, wherein one or more portions of the orthogonal connections are overlapped in a common portion when two or more orthogonal connections are drawn in a same lane area and wherein the orthogonal connections, the rendered nodes, and the lane areas comprise selectable items;

receiving a first user selection of a first selectable item, as a first selected item;

highlighting, in response to the first user selection, orthogonal connections and nodes that are associated with the first selected item, including highlighting a second selectable item and a third selectable item;

receiving, after the first user selection, and while the second selectable item and the third selectable item are highlighted, a second user selection selecting a fourth selectable item as a second selected item;

determining that the second selectable item is associated with both the first selected item and the second selected item;

maintaining highlighting of the second selectable item based on determining that the second selectable item is associated with both the first selected item and the second selected item;

determining that the third selectable item is associated with the first selected item but not associated with the second selected item; and removing highlighting from the third selectable item based on determining that the third selectable item is associated with the first selected item but not associated with the second selected item.

17. The computer program product of claim 16, wherein highlighting orthogonal connections and nodes that are associated with the first selected item includes applying one or more styles which indicate a number of connections that include the common portion.

18. The computer program product of claim 16, wherein the lane areas comprise multiple tracks, the multiple tracking including a master track and a set of directed tracks, each directed track for showing a single non-overlapped connection and the master track for showing overlapped connection portions.

* * * * *